(12) United States Patent
Oda

(10) Patent No.: US 6,540,244 B1
(45) Date of Patent: Apr. 1, 2003

(54) HUMAN-POWERED DRIVING MECHANISM

(76) Inventor: Noriyuki Oda, 2-30-8 Satsukigaoka, Hanamigawa-ku, Chiba-shi, Chiba-ken (JP)

( * ) Notice: Subject to any disclaimer, the term of this patent is extended or adjusted under 35 U.S.C. 154(b) by 0 days.

(21) Appl. No.: 09/787,654

(22) PCT Filed: Sep. 21, 1999

(86) PCT No.: PCT/JP99/05147

§ 371 (c)(1),
(2), (4) Date: Mar. 21, 2001

(87) PCT Pub. No.: WO00/17039

PCT Pub. Date: Mar. 30, 2000

(30) Foreign Application Priority Data

| Sep. 20, 1998 | (JP) | 10-268476 |
| Sep. 20, 1999 | (JP) | 11-266391 |

(51) Int. Cl.[7] ............................................. B62M 1/02
(52) U.S. Cl. ........................................................ 280/261
(58) Field of Search ............................ 280/210, 259–261

(56) References Cited

U.S. PATENT DOCUMENTS

| 4,125,239 A | 11/1978 | Berclaz et al. ............. 248/69 |
| 4,706,516 A | 11/1987 | Xi ............................... 74/594.1 |
| 4,807,491 A | 2/1989 | Stuckenbrok .............. 74/594.1 |
| 4,872,695 A | 10/1989 | Silvano et al. ............. 280/257 |
| 5,876,053 A | * 3/1999 | Ray ............................. 280/261 |

FOREIGN PATENT DOCUMENTS

| JP | 50-20348 | 3/1975 |
| JP | 50-125437 | 10/1975 |
| JP | 58-133986 | 8/1983 |
| JP | 58-199279 | 11/1983 |
| JP | 58-221783 | 12/1983 |
| JP | 1-269689 | 10/1989 |
| JP | 4-50595 | 4/1992 |
| JP | 5-294276 | 11/1993 |
| JP | 6-92284 | 4/1994 |
| JP | 3015873 | 7/1995 |
| JP | 8-113180 | 5/1996 |
| JP | 9-2365 | 1/1997 |

OTHER PUBLICATIONS

E.R. Burke (editor), "High–Tech Cycling", Human Kinetics, Library of Congress Cataloging–in–Publication Data, 1996, pp. 149–154.
R. Ballantine et al., Ultimate Bicycling Book 1992, pp. 8–9.

* cited by examiner

Primary Examiner—Daniel G. DePumpo
Assistant Examiner—Matthew Luby
(74) Attorney, Agent, or Firm—Fitzpatrick, Cella, Harper & Scinto

(57) ABSTRACT

A human powered drive units each including a pair of a rotatable member having a sprocket and a supporting member having a sprocket, which are arranged up and down, and including a chain extended around the rotatable member and the supporting member, are disposed at left and right sides, respectively. The left and right rotatable members 1, 100 are fixed on a driving shaft 15. A chain ring 6 on which the load is applied is mounted on the driving shaft between upper rotatable member 1 and rotatable member 100. In each of the units, constraining means including a free crank (10 for the right-hand unit, and 1000 for the left-hand unit) and arm (11 for the right-hand unit, and 1100 for the left-hand unit), is provided so as to maintain perpendicularity of a shaft of the pedal relative to the plane in which the chain moves. By the rider kicking the pedal along the closed orbit including a linear orbit portion, the force transmitted to the pedal from the foot of the rider is efficiently converted to a rotational force in a longer period of time, thus increasing the power input.

11 Claims, 16 Drawing Sheets

HUMAN-POWERED DRIVING MECHANISM

This application is a National Stage under 35 U.S.C. § 371 of International Application No. PCT/JP99/05147, filed Sep. 21, 1999, published in Japanese (not English) as International Publication No. WO 00/17039 on Mar. 30, 2000, which claims the benefit of Japanese Patent Application Nos. 268476/1998, filed Sep. 22, 1998, and 266391/1999, filed Sep. 20, 1999.

TECHNICAL FIELD

The present invention primarily relates to a driving mechanism for a human-powered vehicle such as a bicycle, a wheelchair, a boat, or a human-powered airplane, or a human-powered machine comparable to a human-powered vehicle, for example, a muscle training machine.

BACKGROUND ART

The driving mechanism for a bicycle and the driving mechanism for a leisure recreational pedal boat are identical in principle. Both driving mechanisms comprise a rotational axle, two cranks, or the left and right cranks, and a pair of pedals. More specifically, the two cranks are rendered different in rotational phase by 180°, with one end of each crank being fixed to the rotational axle at a right angle. The other end of each crank is provided with a shaft, which is anchored to the crank at a right angle, and around which a pedal is rotationally fitted. Torque is generated as an operator steps on the pedal, and this torque is used to rotate the propelling means, such as a wheel, a propeller, or the like, of a human-powered vehicle to move the vehicle. In recent years, there have appeared a tricycle and a four-wheel-cycle, in addition to a bicycle, and they seem to have been used even for competitive sports, in Europe and the United States. However, the driving mechanism for a human-powered vehicle has not changed at all in principle.

A bicycle is very widely used as means for recreation, means for commuting to and from school or work, and means for competition, and therefore, the bicycle industry is very large. Here, the present invention will be described with reference to a bicycle for the sake of simplicity.

A bicycle has been developed in accordance with its usage, and therefore, there are many kinds of bicycles different in structure and appearance. As far as the present invention is concerned, which relates to a driving mechanism for a human-powered vehicle, there are bicycles equipped with a speed changing mechanism for improving a bicycle in speed and climbing performance. There are various speed changing mechanisms. Basically, they comprise a plurality of sprockets attached to a follower axle, that is, the rear wheel axle (hereinafter, this type of sprocket will be referred to as "follower axle sprocket"), and only a single sprocket attached to the driving axle by a chain, whereas some of them comprise a plurality of sprockets attached to the driving axle (hereinafter, this type of sprocket will be referred to as "chain ring"), and the aforementioned follower axle sprockets, which are connected to each other by a chain. Also widely used in the field of a human-powered vehicle are driving mechanisms equipped with a planetary gear mechanism attached to the follower axle. It should be noted here that in this patent application, the human-powered vehicle driving mechanism means a driving mechanism for transmitting human power to the speed changing mechanism of a human powered vehicle, or the propelling means, for example, a wheel, a propeller, and the like, of a human-powered vehicle.

In principle, a speed changing mechanism does not improve energy conversion efficiency, regardless of its configuration. In other words, it does not increase the total amount of the power transmitted to a propelling means (bicycle rear wheel, boat propeller, and the like), or reduce the total amount of energy consumed by a driver per hour.

If an attempt is made by a bicycle rider to climb a slope using the same speed increasing ratio as that used when the rider is running on flat land, a □larger force is necessary, and whether or not the rider can continue riding the bicycle is determined by the strength of the legs of the rider. To the rider, a speed changing mechanism is an apparatus for trading the speed of applying force for the applied force, or an apparatus for optimizing the balance between speed of applying force and the applied force. In other words, if the muscular force becomes insufficient upon uphill riding, the speed changing mechanism is down-shifted to reduce the speed increasing ratio, allowing the muscles to move at a higher speed with a smaller amount of force, and yet producing the same amount of power. However, reducing the speed increasing ratio below a certain level is meaningless. That is, as the speed increasing ratio is reduced in order to keep the bicycle running, the rider must pedal faster to rotate the driving axle faster in reverse proportion to the decrease in the speed increasing ratio, which in turn causes the rider to reach his or her limit in physical capacity, and also increases the friction and/or vibrations for which the bearings and chain of the driving mechanism are responsible. Eventually, it becomes impossible for the rider to keep the bicycle balanced to continue riding.

The provision of a speed changing mechanism does not guaranty increase in the power input. Thus, it is obvious that there is a limit in the improvement in slope climbing performance. Therefore, a means for increasing the power input by a rider has been desired. Here, the power input by a rider means the amount of the power (amount of work per unit of time) transmitted from the rider of a bicycle, that is, a human-powered vehicle, to the bicycle through the driving mechanism of the bicycle. In a speed changing mechanism, the revolution of its output shaft is in inverse proportion to the amount of the torque output through the output shaft, the product of the two (revolution of the output shaft and the amount of the torque output through the output shaft) remains constant. In other words, a speed changing mechanism allows the speed increasing ratio, that is, the balance point between the muscular speed and force, to be changed in accordance with the physical capacity of a rider and the riding conditions, in the direction to allow the rider to feel more comfortable. In principle, however, a speed changing mechanism does not change the overall amount of the power input by a rider, and therefore, the overall amount of the power output through the output shaft does not change.

Changing the length of a crank results in a trade-off between the speed at which a rider moves his or her muscles, and the amount of muscular force generated by him or her per pedaling stroke. Optimizing the crank length sometimes results in a small amount of increase in output, but this does not mean increase in input.

There are a certain number of inventions regarding the above described driving mechanism for a human-powered vehicle, for which patent applications have been submitted (U.S. Pat. Nos. 4,125,239, 4,706,516, 4,807,491, and the like). According to them, the cranks of a bicycle are configured so that they can be lengthened or shortened, and the rotational phases of the cranks are synchronized with the lengthening or shortening of the cranks with the use of a planetary gear based mechanism or a cam based mechanism so that the cranks become longest when they are horizontally extending forward to increase the amount of the maximum torque input by the rider.

In the case of the above described driving mechanism for a human-powered vehicle, as one of the pedals moves past the position where the crank to which the pedal is attached is horizontal, it enters a part of its rotational range in which the crank to which the pedal is attached begins to shorten. In this rotational range of the pedal, the force which acts in the radial direction of the locus of the pedal shaft, that is, a component of the force input by the rider through the pedal, drastically increases and resists the shortening of the crank, interfering with the rotation of the crank.

Even in the case of the human-powered vehicle driving mechanism described above, as long as the force applied to a pedal is always made to act tangential to the locus of the pedal shaft, this force does not interfere with the rotation of the crank. Actually, however, the ankle joints, knee joints, and hip joints, are limited in their ranges of movement, and therefore, the force applied to the pedal always acts downward in the virtually vertical direction regardless of rotational angle of the crank. Thus, when a crank is virtually horizontally extending forward, the tangential line to the locus of the pedal shaft and the direction in which the force is applied to the pedal virtually coincide with each other, and therefore, the magnitude of the "torque," that is, the component of the force applied to the pedal, which acts in the direction to rotate the pedal about the driving axle becomes maximum.

However, as the pedal moves past the point which corresponds to the virtually horizontal forward position of the crank, the torque (more precisely, the force which acts in the rotational direction of the crank, that is, a component force of the resultant force of the gravitational force, inertial force, and muscular force,) reduces, whereas the component force perpendicular to the rotational direction of the crank (more precisely, the force which acts in the longitudinal direction of the crank, that is, a component force of the resultant force of gravitational force, inertial force, and muscular force), that is, the force which acts in the direction to lengthen the crank against the force which acts in the direction to shorten the crank, increases, creating an effect equivalent to the effect of a mechanical brake. Thus, as far as a single rotational cycle of the crank is concerned, this structural arrangement for a human-powered vehicle driving mechanism has not increased power output in practical terms.

As an invention similar to the aforementioned human-powered vehicle driving mechanism, in which the crank length are rendered variable, there is U.S. Pat. No. 4,872,695. According to this patent, the driving mechanism comprises a rear wheel fork, a pair of bearings, a pair of connecting rods, a pair of cranks, and a pair of pedals. The bearing is pivotally attached to the rear wheel fork, and one end of the connecting rod is slidably fitted in the bearing. The end portion of the crank is rotationally connected to the connecting rod, at a point slightly toward the end portion with respect to the center, and the pedal is attached to this end portion of the rod. Thus, as a rider steps on the pedal, the connecting rod acts as a lever having the bearing as its fulcrum, amplifying the applied force from the rider as it is transmitted to the crank.

According to this cited invention, the applied force from the rider is amplified regardless of the rotational angle of the crank, and therefore, the torque definitely increases while the crank is in the portion (hereinafter, down stroke period) of its rotational range in which the pedal moves from its highest position (so-called top dead center) to its lowest position (so-called bottom dead center). However, while the crank is in the portion (hereinafter, up stroke period) of its rotational range in which the pedal moves from its lowest position to its highest position, negative torque is amplified. During the latter period, "leverage" is greater than during the former period; in other words, the ratio at which negative torque is amplified is greater than the ratio at which positive torque is amplified. Thus, as far as the entirety of a single pedaling cycle is concerned, increase in power output cannot be expected even in the case of the structural arrangement disclosed in the cited patent.

FIG. 13 is a graph created by modifying FIG. 7.3 in High-Tech Cycling (Human Kinetics, P.O. Box 5076, Campaign, Ill., USA) in order to effectively describe the present invention, and shows the relationship between the rotational force (the tangential component of the force acting on a pedal) and crank angle. The change of the rotational force while an American bicycle racer was pedaling with a power of 350 W (which appears to represent the amount of work effected upon the crank per unit of time, although no clear definition is given in the above document), at 90 rpm, is plotted on the axis of ordinates, and the crank angle $\theta$ (clockwise angle with reference to the top dead center) is plotted on the axis of abscissas. According to this graph, the rotational force is highest when the crank angle $\theta$ is slightly greater than 90°, and begin to rapidly reduce as the crank angle $\theta$ is beyond approximately 120°.

A fact that the rotational force reduces while the crank angle $\theta$ is in a range of $120° < \theta < 180°$, in which a sufficient portion of the combination of the weight of the lower limb and the muscular force, acted on the pedal, indicates that during this period, the combination of the weight of the lower limb and the muscular force acts overwhelmingly in the direction to stretch the crank, instead of the direction to rotate the crank. As a result, the energy of the rider is consumed to stretch the crank which could not be stretched. In other words, no matter how large the force applied to the pedal is, as long as the force is caused to act in the direction to stretch the crank, the amount of work accomplished is zero in terms of dynamics. However, within the body of the rider, blood rapidly circulates, and chemical reactions rapidly occurs, while consuming the energy of the rider. On the other hand, in a range of $217° < \theta < 345°$, the rotational force is negative. This is due to the fact that in a range of $180° < \theta < 360°$, the amount of the muscular force which acts in the direction to forwardly rotate the crank, and the weight of the limb which acts in the direction to reversely rotate the crank, equalized at a crank angle of approximately 200°, and eventually, the latter exceeded the former.

The human-powered vehicle driving mechanism disclosed in Japanese Laid-Open Patent Applications 58-133986, 58-221783, and 8-113180 comprise a pair of, that is, left and right drive trains, driving sub-mechanisms made up of a combination of a rope and pulleys, a combination of reciprocable chain and sprockets, and a rack and a pinion gear, correspondingly. In these driving mechanisms, the left and right drive trains are mechanically connected to each other in such a manner that when one side is in the forward stroke, the other side is in the backward stroke (incidentally, the names used for the above described driving mechanism components were arbitrarily chosen by the inventors of the present invention for convenience in describing the components, and they do not necessarily match the names used in the original specifications). For example, as the pedal of the left drive train is stepped in its forward stroke, the applied force is transmitted to the pulley, sprocket, and pinion gear through the rope, chain, and rack, correspondingly, and therefore, the wheels connected to the pulley, sprocket, and the pinion, correspondingly, rotate. When the left drive train is in the backward stroke, the pedal of the left drive train is lifted by the power from the right drive train. Also during this period, the pulley, sprocket, or pinion gear in the left drive train is allowed to idle relative to the output shaft, by a free wheeling mechanism, such as a rachet or one-way clutch, with which their shaft portions are provided.

Whichever of the above described inventions is used, during the forward stroke, human power acts in the direction tangential to the pulley, sprocket, or pinion gear, and therefore, the entirety of the applied force equals to the rotational force (converts into torque). However, at the end of the forward stroke, the movement of the lower limb is suddenly stopped while moving in the positive direction, and therefore, the kinetic energy of the lower limb, chain, rack, sprocket, pinion gear, and the like is forced to become zero. Thus, in terms of the entirety of each pedaling cycle, a significant amount of increase in output cannot be expected from the driving mechanism in accordance with any of the aforementioned inventions.

Japanese Laid-Open Patent Application 58-199279 discloses an invention, according to which the driving mechanism is rendered reciprocal with the employment of a combination of a chain and a sprocket, and a spring is made to absorb a part of the energy transmitted as a rider steps on a pedal, so that the pedal is returned to the pre-stepping (original) pedal position, by the energy stored in the spring. However, this invention also has a problem in that unless the pedaling motion is not synchronized with the free spring movement, increase in the output cannot be expected (if the pedal is stepped on before it fully returns, a sufficient distance is not available for pedal acceleration to have positive work even in the case of this invention, the initial pedal speed, or the pedal speed at the very moment the pedal begins to be stepped on, is considered to be 0 m/s), and therefore, a significant amount of increase in bicycle speed cannot be expected.

A certain number of studies have been done regarding a human-powered vehicle driving mechanism, which have noted the fact that a muscle generates larger force when it is contracted at a low speed than when it is contracted at a high speed. According to these studies, the chain ring, which normally is truly circular, was made elliptic or the like, and the relationship in the rotational phase between the chain ring and crank was devised to reduce the fluctuation in the crank revolution, so that a rider can apply a larger amount of muscular force to a pedal. However, this method has also a problem in that if the aforementioned relationship in the rotational phase between the chain ring and crank is fixed, the usage of the bicycle is limited. For example, a certain phase difference, which may be suitable for riding a long distance at a constant speed, may not be suitable for riding up a slope or riding at full speed.

The object of the present invention is to solve the problems in the above described prior technologies, so that it becomes possible to provide a driving mechanism which is capable of efficiently converting human power into driving force, and therefore, is most suitable for a human-powered vehicle such as a bicycle, a tricycle, a four-wheel-cycle, a wheelchair, a boat, a human-powered air plane, or a driving mechanism for a device comparable to a human-powered vehicle, for example, a muscle training device.

DISCLOSURE OF INVENTION

The first invention provides a human powered drive mechanism comprising a rotatable member, a supporting member, an endless driving member extended around said rotatable member and said supporting member, and a human powered drive receiving portion mounted to said endless driving member.

The second invention provides a human powered drive mechanism according to the first invention, wherein said supporting member is rotatable.

The third invention provides a human powered drive mechanism according to the first invention, wherein said endless driving member is movable along a large curvature radius portion, first and second small curvature radius portions, and said endless driving member is extended around said supporting member and said rotatable member at the first and second small curvature radius portions.

The fourth invention provides a human powered drive mechanism according to the first invention, further comprising constraining means for constraining rotation of said drive receiving portion about a line included in a plane in which the endless driving member moves.

The fifth invention provides a human powered drive mechanism according to the first invention, wherein said drive receiving portion is rotatable about an axis substantially perpendicular to a plane in which said endless driving member moves.

The sixth invention provides a human powered drive mechanism comprising a first rotatable member, a first supporting member, a first endless driving member extended around said first rotatable member and said first supporting member, a second rotatable member, a second supporting member, a second endless driving member extended around said second rotatable member and said second supporting member, a first human powered drive receiving portion mounted to said first endless driving member and a second human powered drive receiving portion mounted to said second endless driving member, wherein said first rotatable member and second rotatable member are coaxial with each other and are fixed to each other by a shaft member, said shaft member comprising a third rotatable member between said first and second rotatable members.

The seventh invention provides a human powered drive mechanism according to the first invention, wherein said constraining means includes an arm having one end rotatably mounted to said drive receiving portion and a free crank having one end rotatably mounted to a frame and the other end rotatably mounted to the other end of the arm. The eighth invention provides a human powered drive mechanism for a human powered vehicle comprising a propulsion wheel, a rotatable member, a supporting member an endless driving member extended around said rotatable member and said supporting member, and a human powered drive receiving portion mounted to said endless driving member, wherein said propulsion wheel is connected with said rotatable member.

The ninth invention provides a human powered drive mechanism according to the first invention, wherein a rotation axis of said free crank is disposed outside an orbit formed by said endless driving member. The tenth invention provides a human powered drive mechanism comprising a first rotatable member, a first supporting member, a first endless driving member extended around said first rotatable member and said first supporting member, a second rotatable member, a second supporting member, a second endless driving member extended around said second rotatable member and said second supporting member, a first human powered drive receiving portion mounted to said first endless driving member and a second human powered drive receiving portion mounted to said second endless driving member, wherein said first rotatable member and second rotatable member are coaxial with said propulsion wheel.

The eleventh invention provides a human powered drive mechanism according to the eighth invention, wherein said human powered vehicle is a bicycle.

The twelfth invention provides a human powered drive mechanism according to the eighth invention, wherein an inclination angle of a large curvature radius portion of said endless driving member relative to the ground is variable.

The thirteenth invention provides a human powered drive mechanism according to the fourth invention, wherein said endless driving member includes a plurality of links, and one of said links constitutes a driving force receiving link, wherein said driving force receiving link is provided with a shaft projected in a direction perpendicular to a plane in which said endless driving member moves, and said driving force receiving link is rotatably mounted to said constraining means through the shaft.

The fourteenth invention provides a human powered drive mechanism according to the thirteenth invention, wherein the shaft is integral with said driving force receiving link, and is rotatable relative to said constraining means.

The fifteenth invention provides a human powered drive mechanism according to the thirteenth invention, wherein said driving force receiving link is provided with a U-shaped groove, in which said driving force receiving link is rotatably connected with an adjacent link of said endless driving member.

The sixteenth invention provides a human powered drive mechanism according to the thirteenth invention, wherein said driving force receiving link is rotatably mounted to said constraining means by a roller bearing or a linear motion bearing such as a linear bush or the like.

In this specification, the rotatable member means a sprocket or a pulley for driving a load by being rotated by the endless driving member, and the supporting member means an arcuate guiding rail on which the endless driving member is extended circumferentially or a rotatable member on which the endless driving member is extended or trained and which rotates fundamentally idly. In the present invention, the endless driving member means a flexible member such a belt, timing belt, chain, bead chain, pinned chain, rope or the like, which is substantially freely collapsible and bendable but is not free against tensile force to permit transmission of a rotational force. The human powered drive receiving portion means a pedal, handle or the like to which the human power is directly applied. The frame means a member supporting the vehicle and forming the structure, or a structural member such as a pipe, a gauge steel, plate or the like.

The large radius curvature portion may have a radius of curvature which is infinite, that is, it may be linear, or the portion may be a slightly curved defined by a guiding rail or by an idle sprocket or the like.

According to the human powered drive mechanism of the present invention, the pair of the rotatable member and the supporting member can be located at an angle and a position with which the user can easily impart the force along the large radius curvature portion of the endless driving member through the human powered drive receiving portion, so that 100% of the human power can be converted to the driving torque at the large radius curvature portion, and the maximum level of the rotational force continues for a predetermined period of time, and in addition, at an end portion of the large radius curvature portion, the kinetic energy of the moving mass is converted to a rotational energy at the small curvature radius portion and is reserved. As a result, a significant increase of the power input is accomplished.

Because of the increase of the power input, the uphill performance is significantly improved such that changing speed mechanism is not necessarily required on a normal road.

The preferred human powered drive mechanism of the present invention comprises a chain having a pedal or a handle, a rotatable member and a supporting member along which the chain is trained, the pedal or the handle is maintained, by the constraining means, substantially perpendicular to the movement surface of the chain. Further preferably, the supporting member is in the form of a rotatable member.

In such a case, even if a force is imparted to the pedal or the handle, the chain is not bent or twisted, and therefore, the chain is protected from deformation or damage. Additionally, the position of the force acting point is determined so that application of force is easy with less muscle and joint fatigue.

In that case, it is preferable that the constraining means comprises a free crank rotatably mounted to the frame at an end thereof and an arm rotatably mounted to the other end of the free crank, and the arm is rotatably mounted to the drive receiving portion. Since the arm is rotatably mounted to the drive receiving portion, the rotation of the arm does not obstruct the motion of the chain, or the chain does not receive abnormal force. The advantage of the constraining means of this type is in that use can be made, for support and connection for the free crank and/or the arm, with a ball bearing, cylindrical roller bearing or needle bearing with which the frictional loss is very small and which is light in weight and small in size and with which the dust sealing is easy.

Further preferably, at the connecting portion between the arm and the chain, at least an outer ring of a cylindrical roller bearing or needle bearing is mounted to an end of the arm, and the chain is provided with a driving force receiving link, which is inserted into the outer ring with the rollers therebetween. The chain comprises a great number of chain links to permit continuous rotation. It is preferable that one of the chain links functions as the driving force receiving member.

It is preferable that relative motion in the axial direction is permitted between the outer ring of the bearing mounted to the end of the arm and the driving force receiving link inserted into the ring, since then the weights of the arm, crank and frame are reduced. When an attempt is made to reduce the weights of the arm, crank and frame, less rigidities tend to result, so that trace of revolving of the pedal about the line included in a plane in which the chain moves becomes relatively large due to the less rigidities, and therefore, when the pedal approaches to the sprocket, the link plates in the chain tend to strongly hit the side surfaces of the sprocket, even though the constraining means satisfies the original purpose not to give damages to the chain.

By selecting a cylindrical roller bearing, a needle bearing, a linear motion bearing (such as a linear bush bearing or the like) or the like, in which the shaft is supported for rotation and for axial displacement, so that only the pedal is displaced solely in the axial direction, by which the driving force receiving link is kept perpendicular to the chain moving plane, thus preventing the strong hit of the chain to the side surfaces of the sprocket. When the arm, the crank and the frame supporting the crank have sufficient rigidities, the relative displacement in the axial direction between the driving force receiving link and the arm may be prevented by employing a deep groove ball bearing or the like for the connecting portion between the arm and the chain.

Another example of the constraining means includes a combination of a free crank and a linear bush bearing or a ball spline linear bearing, exhibiting a small friction loss, in addition to the above-described combination of the free crank and the arm. However, the system is applicable when the radii of the rotatable member and the supporting member which constitute a pair are equal. More particularly, the structure using a combination of a linear bush bearing and a free crank comprises parallel arranged two rods with a certain length disposed inside the oval orbit formed by the chain and a reciprocating slider supported by the two rods through at least one linear bush bearing for each rod, and a free crank rotatably supported by the slider at one end around an axis perpendicular to the surface formed by said oval track which is rotatably supporting a pedal or a handle at the other end. The structure using a combination of a ball spline and a free crank comprises a linear bush rotatably affixed to a point on the bicycle frame, and a spline rod slidably supported by said bush at one end and rotatably supporting a pedal shaft or a handle shaft at the other end.

According to an embodiment of the present invention, the center of rotation of the free crank is disposed inside the oval orbit formed by the chain. In this case, it is further preferable that center of rotation of the free crank is disposed at the center of a line connecting centers of the rotatable member and the supporting member which constitute a pair. By doing so, the sum of the radius of rotation of the free crank and the radius of rotation of the arm is minimum, so that bending and torsion of the free crank and the arm are small, and therefore, the weight saving is accomplished.

In another example of the position of the center of rotation of the free crank, the center of rotation of the free crank is disposed outside the oval orbit formed by the chain. In this case, when the radius of the pitch circle of the rotatable member and the radius of curvature of the supporting member (the radius of a pitch circle if the supporting member is in the form of a rotatable member), which constitute the pair, are the same, the rotational axis of the free crank is disposed on a line perpendicularly bisecting the line connecting the centers of the rotatable member and the supporting member. By doing so, the sum of the radius of rotation of the free crank and the radius of rotation of the arm can be made small, so that bending and torsion of the free crank and the arm are small, and therefore, the weight saving is accomplished. By selecting a length of the free crank such that a swing range of the free crank does not overlap the moving range of the endless driving member, the free crank can be disposed closer to the center line of the bicycle or the like than the arm, thus accomplishing compact human powered drive mechanism.

In the case of bicycle, when the center of rotation of the free crank is disposed at a rear side of the pedal, hitting an obstruction can be avoided in rough road riding, and therefore, the arrangement is preferably employed in BMX (bicycle motocross) or the like intended for rough road riding. In the case of bicycles, when the axis of rotation of the free crank is disposed in a front side of the pedal, the large space in the front side of the pedal can be utilized, so that latitude of disposition of the arm and the crank is improved. In addition, the gravity center of the bicycle is shifted toward front side, so that rear wheel can be disposed in the front side, by which the wheelbase which is a distance between the centers of the front and rear wheels can be reduced, thus improving a rotation performance and an acceleration performance of the bicycle. It is known that by reducing the wheelbase, the rotation performance and the acceleration performance are remarkably improved. However, doing so results in the gravity center at a relatively rear position, so that there arises a problem that front wheel tends to rise during uphill riding or the like. For this reason, it has been difficult to make the wheelbase shorter than the present length.

In the case of tricycle, four-wheel-cycle, wheelchair or the like, in which a maneuvering handle (this term is used for a steering handle for the purpose of distinction from the handle functioning as the drive receiving portion) is operated by one of the hands, and the driving force is applied through the handle by the other hand, preferably the human powered drive mechanism is arranged under the driver's arm outside the driver (the side of the driver) disposed slightly foreside of the driver with lower side ahead inclined center line connecting the centers of the rotatable member and the supporting member which constitute a pair. By this, the motion of the arm of the rider is smooth, and therefore, the riders weight can be easily applied to the arm with less fatigue.

In a further example, tightening means for normally tightening the chain is used. The constraining means comprising the arm and the free crank is effective to prevent the chain from deviating out of the regular moving plane and/or to prevent it from deforming, but it is not effective to prevent the chain from deviating from the oval orbit within the regular moving plane. With the structure of the present invention, the pulling force is directly applied to the chain link. If the chain is loose, the chain snakes at the linear portion of the oval orbit by the pulling, and at the sprocket portion, the rollers of the chain might be disengaged from the teeth of the sprocket. If it happens, the power loss is large, and the rollers and pins of the chain may be worn shortly. The tightening means for the chain preferably includes cylindrical members such as pipes to which the rotatable member and the supporting member are mounted, respectively, and the cylinders are telescoped for vertical sliding motion relative to each other, and a spring compressed between bottom plates of the cylinders. The tightening means may be studs, bolts or a combination thereof or the like to urge the cylinders vertically away from each other so as to tighten the chain.

Alternatively, an idle sprocket, idle roller or the like may be additionally provided, and a spring or the like for tightening the chain.

Generally, a damage in a chain drive mechanism relatively frequently occurs by the rollers or the link plates of the chain hitting the sprocket when the chain is moving on the sprocket. In view of this, there may be provided a guiding roller preferably coaxial with the pedal shaft or the handle shaft may be provided adjacent to the connecting portion between the chain and the pedal or the handle, and a rolling rail on which the guiding roller rolls and which covers at least a part of at least the lower one of the rotatable member and the supporting member, so as to prevent the rollers of the chain from disengaging from the teeth of the sprocket. In a preferable example of the human powered drive mechanism, the chain having the pedal or handle is provided at each of left and right sides. The right-hand side chain is trained on the first rotatable member and the first supporting member, and the left side chain is trained on the second rotatable member and the second supporting member; the first and second rotatable members are fixed to a common shaft. The third rotatable member in the form of a chain ring is fixed to the common shaft between the first and second rotatable member. The power applied to the left and right pedals or handles is transmitted to the chain ring through the left and right chains and the first or second rotatable member, and the power is further transmitted to the driving wheel (rear wheel in the case of the bicycle, or water wheel, propeller or the like in the case of boat) through the chain connected to the chain ring and the gear or the like. The supporting member may be in the form of a guiding rail having a width slightly smaller than the inner width of the link plates in the chain with the rollers of the chain rolling on the rail. In this case, the structure is simple with larger latitude of arrangement. When the supporting member is in the form of a rotatable member, the friction loss is smaller.

Further preferably, the left and right pedals and handles are phase-shifted by approx one half period. By doing so, the legs or the arms are used alternately, so that power can be applied continuously with smaller variation of rotation of the common shaft, and the force can be applied stably and uniformly, and therefore, less fatigue of the rider is expected. Here, the assembly comprising the chain and the rotatable member and the supporting member constituting a pair and engaging with the chain is called "human powered drive unit" for simplicity of explanation. As regards the positions of the seat and the human powered drive units which are parallel to each other, the seat may be disposed in the middle of the human powered drive units, in the rear middle, in the front middle (the rider sits facing rearward and kick the pedals or pull the handles as in boat race), in the upper middle (normal in the case of bicycles) or in lower middle. A proper arrangement and an inclination angle of the human-powered drive unit is selected in consideration of the easy application of forces to the human powered drive receiving portions by the legs or arms of the rider.

In one example of the bicycle of the present invention, the human powered drive units which are substantially parallel to each other are disposed below the seat and inclined top side ahead. With this structure, the driver grips the maneuvering handle and kicks down the pedal rearward, so that pedal can be kicked using the muscle gluteus and back muscles, and therefore, high power can be imparted to the pedal.

In another example, the substantially parallel human powered drive units are disposed below the seat at slightly frontward positions such that linear orbit portion of the chain at the power phase is inclined bottom side ahead. With such a structure, as the rider can take a position that he or she pulls the maneuvering handle with the hands and kicks down the pedal the pedal can be kicked using the gluteus and back muscles, and therefore, high power can be imparted to the pedals.

In a further example, the substantially parallel human powered drive units are disposed below the seat, and the linear orbit portion of the chain at the power phase extends vertically. With this structure, the rider can easily apply all of his or her weight on the pedal, so that it is preferable for uphill riding.

In a preferable example of the human powered drive mechanism, the chain having the pedal or handle is disposed at each of the left and right sides; the right-hand side chain is trained on the first rotatable member and the first supporting member; the left side chain is trained on the second rotatable member and the second supporting member; and the first rotatable member and the second rotatable member are coaxial with the propulsion wheel (the front wheel or rear wheel in the case of bicycle, or the water wheel or propeller or the like in the case of boat). For example, in the case of bicycle, the first rotatable member and the second rotatable member have shaft which is common to the front wheel or the rear wheel, or they are made coaxial using a planetary gear transmission.

In a preferable example of the human powered drive mechanism of the present invention, an inclination angle of a large curvature radius portion of said endless driving member relative to the ground is variable.

With this structure applied to the bicycle, a vertical arrangement in which the large curvature radius portion of the human powered drive mechanism is close to the vertical line, is used during the uphill riding to efficiently apply the rider's weight on the pedals, and the slanted arrangement is used during long distance riding on a flat road, with which the rider can sit on the seat and kicks the pedals forward or backward, thus efficiently using the riders weight, the muscles of the back, loins and legs can be effectively used.

In another preferable example of the human powered drive mechanism according to the present invention, the endless driving member is a chain including a plurality of links connected with pins, one of the links constitutes a driving force receiving link, which is provided with a shaft projected in the direction perpendicular to a plane in which the chain moves, and the driving force receiving link is rotatably mounted to the constraining means through the shaft. In this case, the driving force receiving link is provided with a U-shaped groove which is rotatably connected with adjacent links of the chain. When a timing belt is used, a unit including adjacent two teeth and roots corresponds to the link, and the tooth of the adjacent link is inserted into the U-shaped groove of the driving force receiving link at both sides, and they are rotatably collected by a pin penetrating the U-shaped groove. When a bead belt or a pinned belt is used, a unit including adjacent beads or pins correspond to a link, and the present invention is applicable.

In the foregoing description, a bicycle is taken as an example, but the present invention is applicable to another vehicles or like equipment such as a tricycle, a four-wheel-cycle, a wheelchair, a boat, a human powered plane, a training equipment or the like. According to this invention, the power input is increased so that speed and the torque can be increased thus accomplishing comfortable propulsion of the human powered vehicle. When the present invention is applied to the training equipment, the builder-upper equipment which is similar to a bicycle or boat is provided. When the large curvature radius portion of the human powered-drive mechanism is positioned vertically, and the distance between the centers of the rotatable member and the supporting member is made smaller, thus reducing the pedal stroke, and the motions of the feet and the loins are quite like those during walking, so that present invention is applicable to a walk training machine for rehabilitation of people hard to walk. The human powered drive receiving portion may be a pedal kicked by foot or a handle operated by a hand. In the case of tricycle, four-wheel-cycles, boats or the like, with which the rider can sit deeply, the large curvature radius portion of the endless driving member extended around the rotatable member and the supporting member constituting the pair, is inclined such that front part takes a lower position, and the seat is disposed substantially at the same level as a higher one of the rotatable member and the supporting member at a rear part of the human powered drive mechanism. Additionally, a backrest may be provided. With the backrest, the rider easily apply force to the pedals, and therefore, the present invention is conveniently used. The present invention is not limited to the case where the human powered drive units are disposed at left and right sides, respectively, wherein the phases of the human powered drive receiving portions are deviated by ½ period. For example, in the case of the tricycle, the four-wheel-cycle, the boat or the like, the human powered drive mechanisms of the present invention are substantially horizontally disposed at the lateral sides of the rider on the seat to the level of the riders loins to shoulder, wherein the phases of the left and right units are aligned to each other.

The human powered drive mechanism of the present invention is applicable to the vehicles or like equipment such as a tricycle, a four-wheel-cycle, a wheel chair, a boat, a human powered plane, a training equipment or the like, and the human power can be efficiently converted to torque, so that significant output increase is accomplished, and therefore, a powerless rider can ride a long distance. When the present invention is applied to the bicycle or the wheel chair, the uphill riding performance, the characteristics for evading danger or the like is remarkably improved.

These and other objects, features and advantages of the present invention will become more apparent upon a consideration of the following description of the preferred embodiments of the present invention taken in conjunction with the accompanying drawings.

PREFERRED EMBODIMENTS OF THE PRESENT INVENTION

The human powered drive mechanisms according to the preferred embodiments of the present invention will be described in detail. The present invention is not limited to these embodiments.

Figure 1:
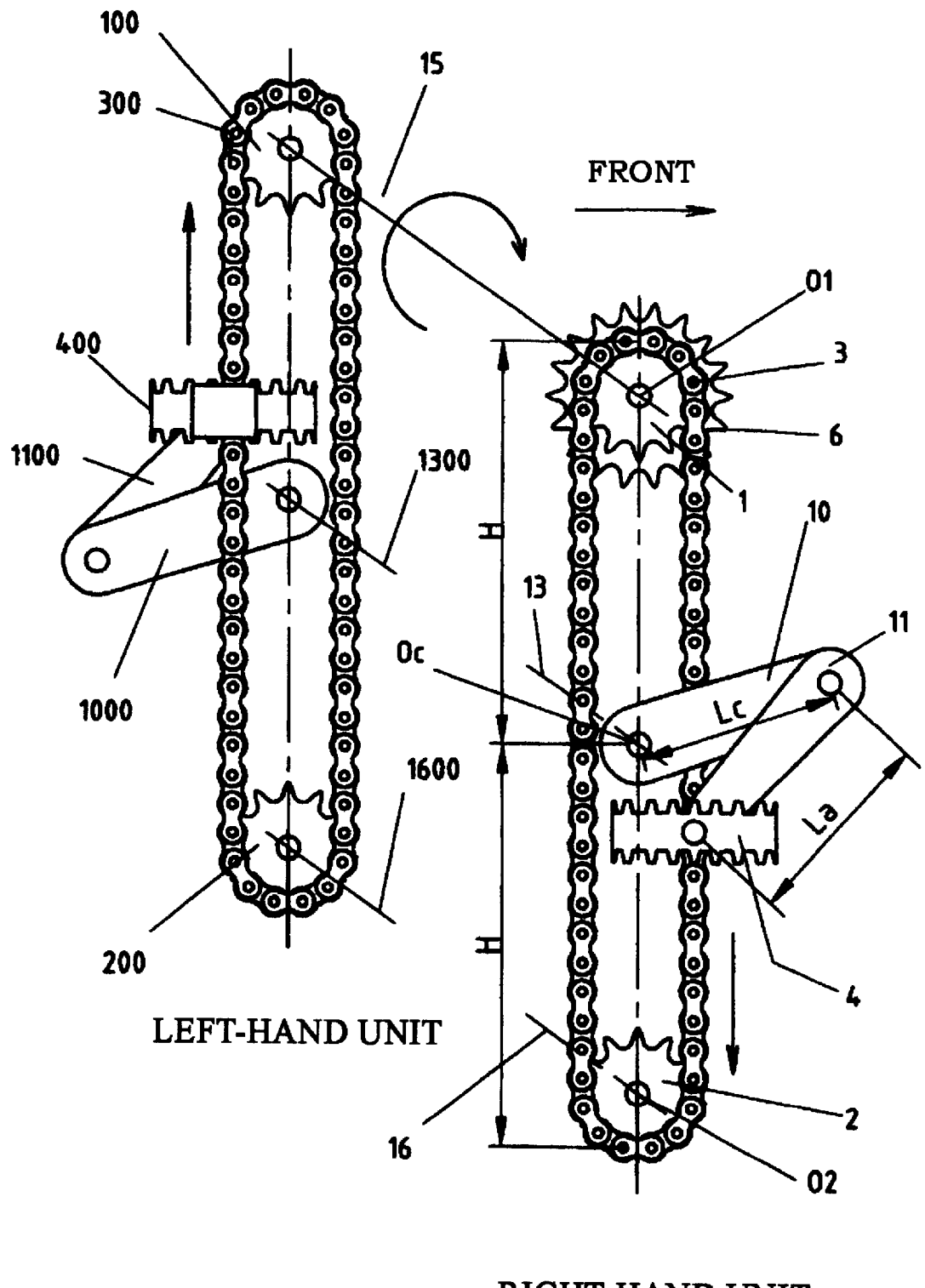
FIG. 1 illustrates a human powered drive mechanism according to a first embodiment in which the human powered drive mechanism is applied to a bicycle.
Figure 2:
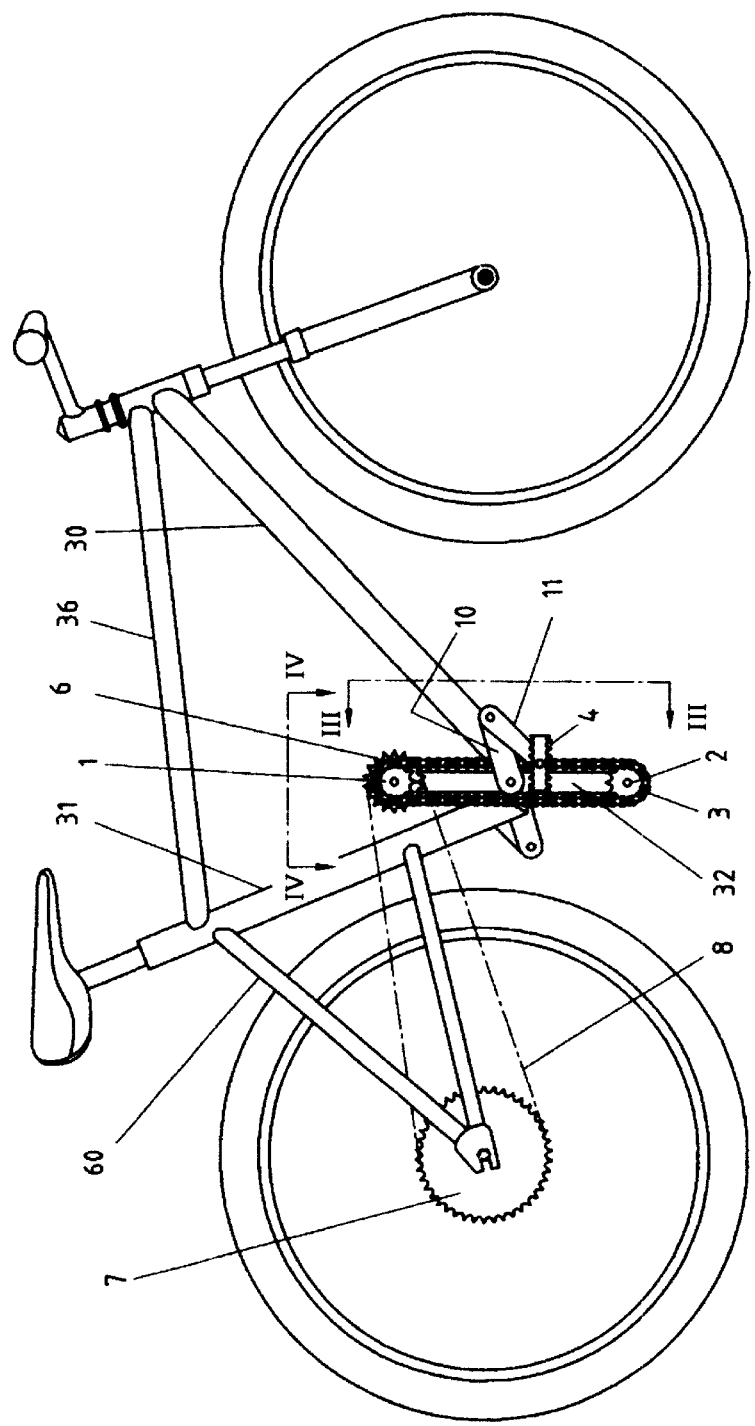
FIG. 2 is a side view of the whole bicycle.
Figure 3:
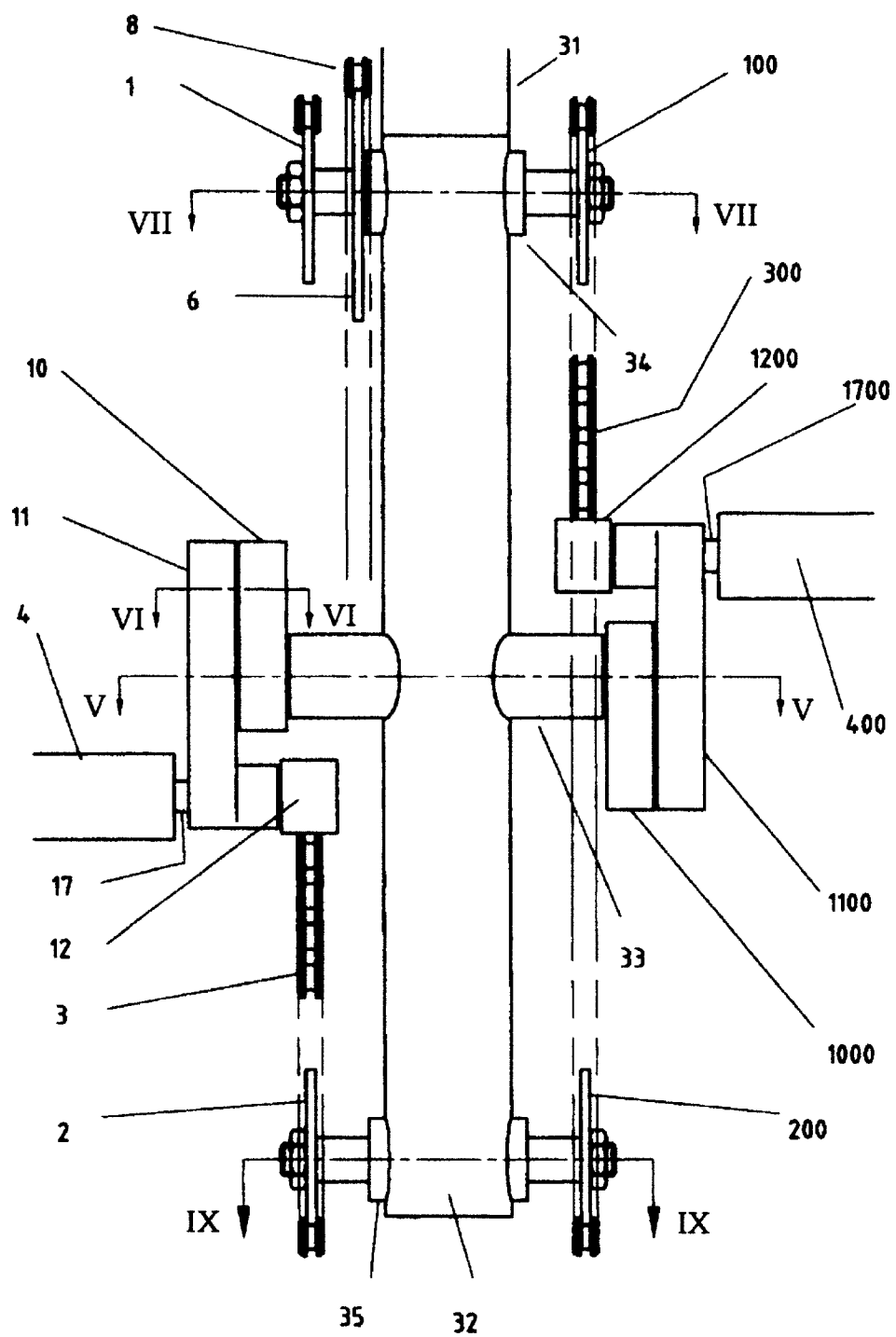
FIG. 3 is a view taken along a line Y—Y of FIG. 2.
Figure 4:
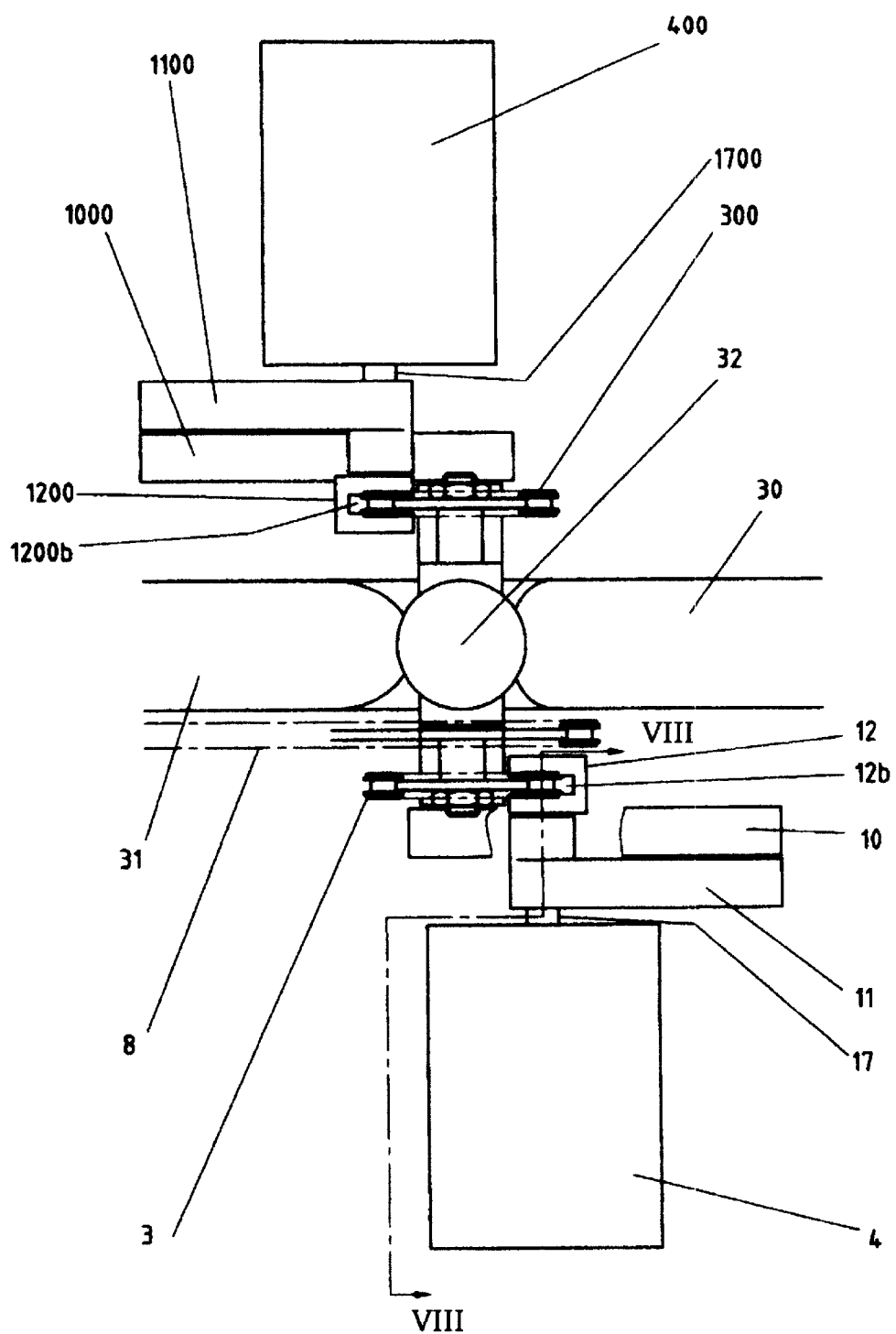
FIG. 4 is a view taken along a line X—X of FIG. 2.
Figure 5:
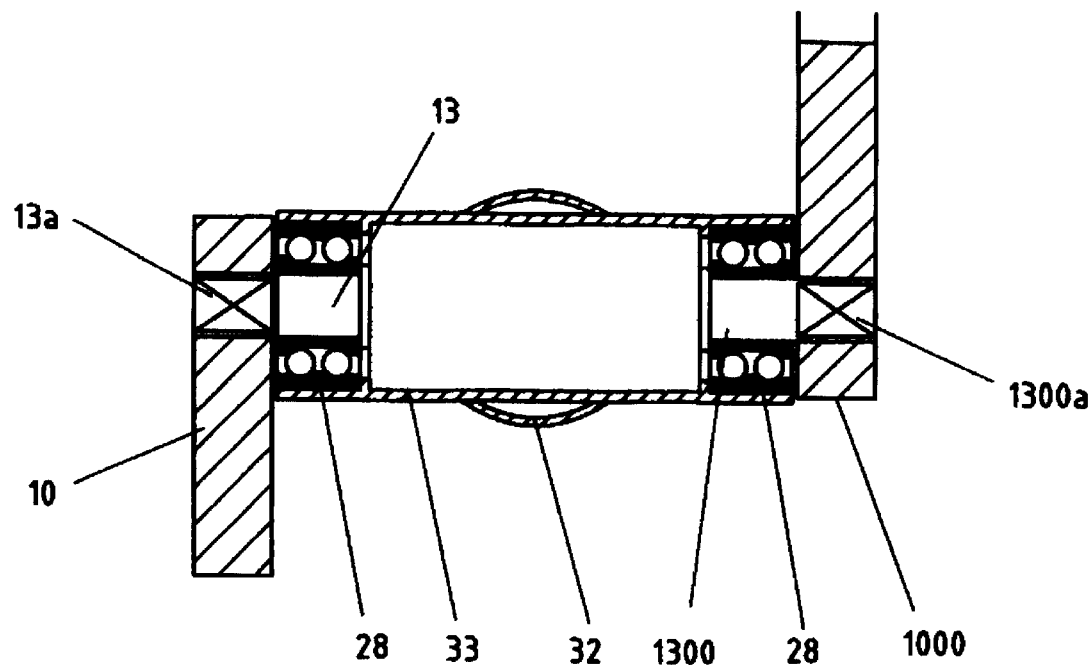
FIG. 5 is a view taken along a line A—A of FIG. 3.
Figure 6:
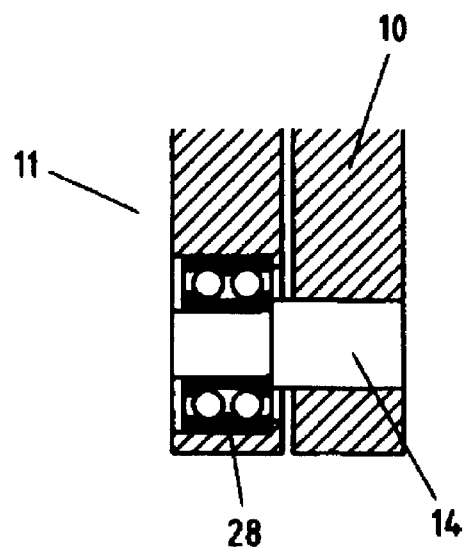
FIG. 6 is a view taken along a line B—B of FIG. 3.
Figure 7:
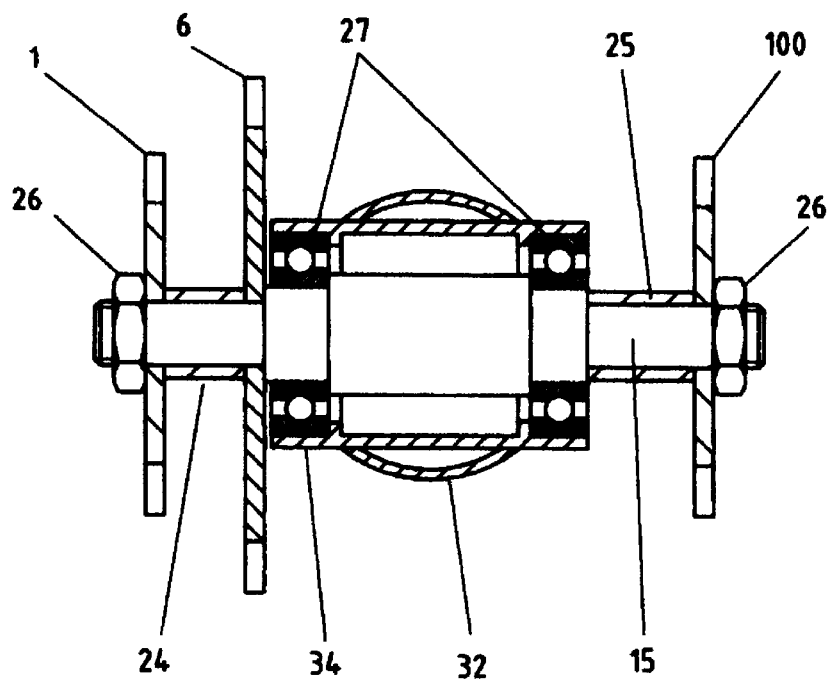
FIG. 7 is a sectional view taken along a line C—C of FIG. 3.
Figure 8:
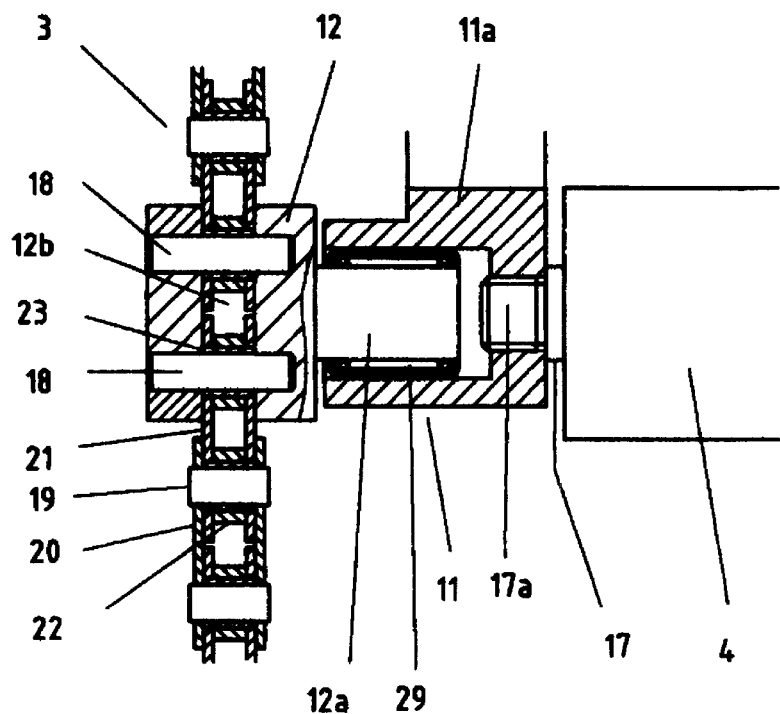
FIG. 8 is a view taken along a line D—D.
Figure 9:
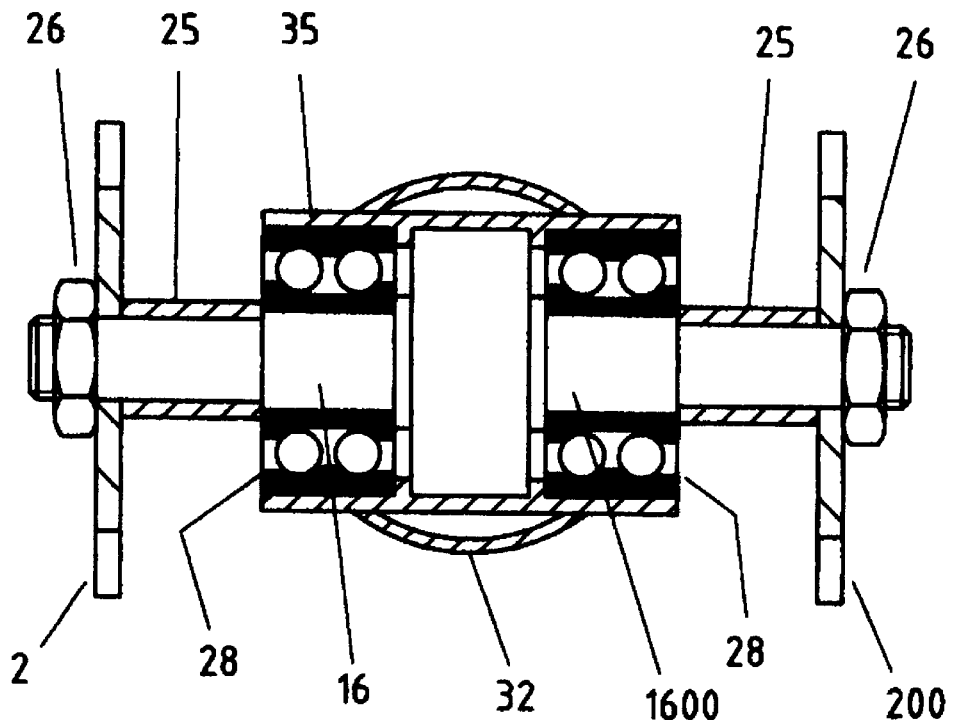
FIG. 9 is a sectional view taken along a line E—E.
Figure 10:
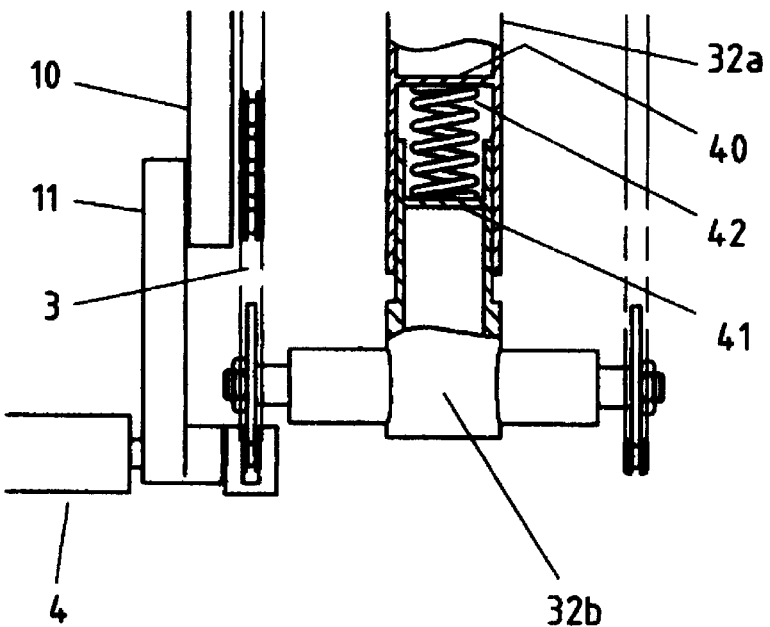
FIG. 10 illustrates a modified example of the mechanism shown in FIG. 3.

FIG. 1 shows a general arrangement of the human powered drive mechanism according to the first embodiment of the present invention which is applied to a bicycle. Left and right human powered drive units are disposed parallel to each other. A line connecting the centers of a rotatable member and a rotatable supporting member extends vertically. Referring to FIG. 1, a human powered drive unit at a front side of the sheet of the drawing, that is, the right side unit of the rider is called "right-hand unit" (also referred to as a "first human powered drive unit"), and the other is called "left-hand unit" (also referred to as a "second human powered drive unit"), the parts of the right-hand unit are assigned with double-digit reference numerals, and the parts of the left-hand unit are assigned with the like numerals with "00" added. Left and right machine elements which need not be discriminated, such as bearings, nuts and the like are given the same reference numerals. FIGS. 2 to 9 illustrate the human powered drive mechanism of this embodiment, and FIG. 2 is a side view of the whole bicycle; FIG. 3 is a view taken along a line Y—Y of FIG. 2; FIG. 4 is a view taken along a line X—X of FIG. 2; FIG. 5 is a view taken along a line A—A of FIG. 3; FIG. 6 is a view taken along a line B—B of FIG. 3; FIG. 7 is a sectional view taken along a line C—C of FIG. 3; FIG. 8 is a view taken along a line D—D; FIG. 9 is a sectional □view taken along a line E—E; and FIG. 10 illustrates a modified example of the mechanism shown in FIG. 3. The following description will be made with respect to the right-hand unit, and the description with respect to the left-hand unit is omitted for the sake of simplicity, except for the necessary parts.

In FIGS. 1 to 9, designated by reference numerals 1 and 2 are a first rotatable member (sprocket) and a first supporting member (sprocket) which are rotatably mounted to a circular cylinder 32 which is extended in the vertical direction, respectively; 100 and 200 are a second rotatable member (sprocket) and a second supporting member (sprocket), respectively; 3 and 300 are chains (endless driving members) trained on or extended around the second rotatable member 100 and second supporting member 200 and forming oval orbits; 4 and the 400 are pedals for driving the chains through driving force receiving links 12, 1200 and pedal shafts 17, 1700, respectively. The pedal 4 (first human powered drive receiving portion), 400 (second human powered drive receiving portion) are mounted at positions with phase deviation by ½ period. Designated by 10, 1000 and 11, 1100 are free cranks and arms which function to maintain perpendicularity between the pedal shafts 17, 1700 and the movement planes of the chains, respectively. Designated by 6 are a chain ring (third rotatable member) which is fixed on a driving shaft 15 together with the first rotatable member 1 and second rotatable member by a nut 26 and spacers 24, 25; and 7 is a driven sprocket of a rear wheel driven by the chain ring 6 through a transmission chain 8. In FIG. 7, the driving shaft 15 is rotatably supported by a boss 34 penetrated through and fixed on the circular cylinder 32 through a bearing 27. The circular cylinder 32 is welded to a connecting part of a down tube 30 and a seat tube 31 of the frame of the bicycle.

In FIG. 1, the transmission chain 8, the driven sprocket 7, the down tube 30, the seat tube 31 and so on may be conventional ones.

In FIG. 5, the free cranks 10, 1000 are press-fitted to flat face machined shaft ends 13a and 1300a of the crank shafts 13, 1300, respectively, and are rotatably supported by a boss 33 penetrated through and fixed on the circular cylinder 32 through a bearing 28. The crank shafts 13, 1300 are rotated idly by motion of the crank. In FIG. 6, the arm 11 is rotatably mounted on the connecting shaft 14 fixed to the free crank 10 by shrink fit, through a double row angular contact ball bearing 28. The same applies to the left-hand unit. The pair of the free crank and the arm constitutes constraining means which is effective to maintain the perpendicularity of the pedal shaft relative to the movement plane of the chain when the pedal receives the driving force. This prevents the links of the chains 3, 300 from receiving bending moment or torsion and assures application of the forces from the feet of the rider. Therefore, it is not necessary that chains have high strength against moment about a line included in the movement plane thereof. Because of this, a chain having light weight and thin links, such as the normal chains for multi stage transmission type bicycle is usable in this environment.

In FIGS. 4, 8, the pedal 4 is rotatably mounted on the pedal shaft 17 by an unshown bearing (it may be a normally used one for the pedal of a bicycle), the pedal shaft is fixed by being screwed into a side of an end boss 11a of the arm 11, and a needle bearing 29 is placed in the boss 11a, and a shaft portion 12a of the driving force receiving link 12 is inserted into the bearing 29. The U-shaped groove 12b of the driving force receiving link 12 is engaged by one end link 3a and the other end link 3b of the chain 3 with an outer link plate 20 removed, and the end links 3a and 3b are rotatably mounted in the U-shaped groove of the driving force receiving link 12 by a knock pin 18 penetrating through the inside of the bush 23. The knock pin 18 has the same diameter as the pin 19, and is loosely fitted into the bush 23 similarly to the pin 19, and a roller 22 is loosely fitted around the bush 23.

In this manner, the chain 3 constitutes the endless driving member by the U-shaped groove 12b and the two pins 18. An axial relative displacement between the shaft portion 12a of the driving force receiving link and the needle bearing 29 is permitted. Therefore, even if such a strong kicking force is applied on the pedal 4 that crank and the arm are slightly deformed or twisted, the chain is not subjected to significant bending or torsion since the angle change of the arm boss portion 11a is small although the pedal is slightly displaced outwardly. The pin 18 is supported by the U-shaped groove at the opposite ends, and therefore, no large stress is applied to the pin 18 by the tension of the chain 3. The bearing 29 may be a cylindrical roller bearing or a linear motion bearing such as a linear bush in place of the needle bearing. Generally, with the needle bearing or the cylindrical roller bearing, when a bending moment is applied, a large contact pressure is produced at the edges of the needle, which become vulnerable to wearing. In view of these, the edges of the needles or the like may be rounded. By doing so, the stress gradient is released, so that durability is improved. In addition, the shaft portion 12a of case hardened steel having a thin surface layer with a high hardness and a relatively soft inside portion (two-layer structure) is preferable from the standpoint of stress release.

As regards the chain 3, any prior art is usable except for the driving force receiving link 12 and the mounting method therefor.

In FIG. 9, the first supporting member 2 and the second supporting member 200 are fixed on the idle shafts 16, 1600 by nuts 26 and spacers 25, respectively, and are rotatably supported by a boss 35 penetrated through and fixed on the circular cylinder 32. The idle shafts 16, 1600 are rotated idly in accordance with the motion of the chains 3, 300.

FIG. 10 shows an alternative method wherein the circular cylinder 32 is divided into two vertical parts (upper and lower parts), and the top small diameter portion of the lower circular cylinder 32b is slidably inserted into the upper circular cylinder 32a, and a spring 42 is compressed between a spring receptor 41 provided on the lower circular cylinder 32b and they spring holder 40 provided in the upper circular cylinder 32a. The spring is strongly compressed by training of the chain 3. With the structure, the chain is tightened by the spring.

In FIG. 1, the center Oc of the axis of rotation of the free crank 10 is in the middle between the center O1 of the first rotatable member and the center O2 of the idle shaft, a sum of a turning radius Lc of the free crank 10 and a turning radius La of the arm 11 is slightly larger than a distance H between a top position or a bottom position of the center of the pedal and the center of rotation Oc of the free crank. By doing so, the geometrical bottommost position or topmost position do not become a change center or a dead center.

Figure 13:
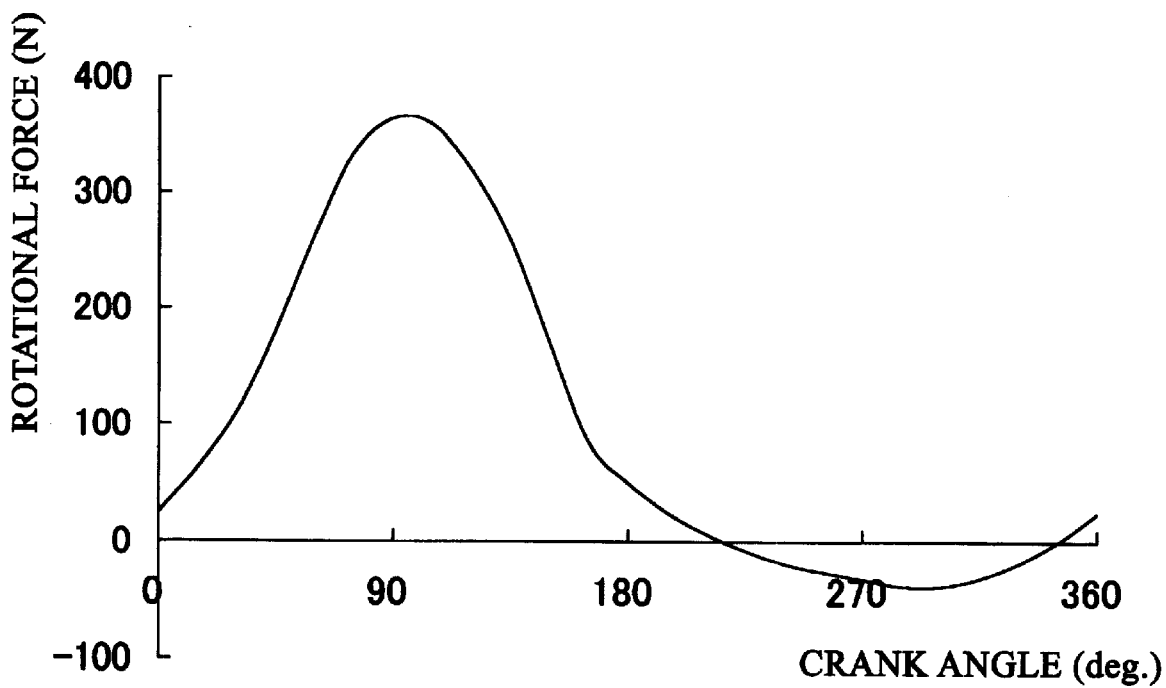
FIG. 13 is a graph showing a relationship between a crank rotating force and a crank angle in a conventional bicycle.

In FIG. 1, the right-hand unit is in a power phase, and the pedal 4 is kicked downwardly by the foot of the rider, so that chain 3 is pulled downwardly as indicated by an arrow. In the large curvature radius portion (the linear portion in this environment) in the power phase, 100% of the force applied on the pedal 4 is converted into torque. Therefore, the maximum rotational force shown in FIG. 13 is maintained in this portion of the phase. Although the weight of the foot or the lower limb is applied on the left-hand pedal 400, the left-hand pedal goes up by utilizing the kinetic energy of the moving mass attached to the pedal which is kept at the final stage of the power phase and by consuming a part of the power generated by the rider's kick on the right-hand pedal, which is the same as are the conventional bicycles.

As contrasted to the above described human powered drive mechanism of reciprocable linear motion type, at the initial stage of the kick in the power phase, the moving speed of the pedal is still high, there is no need of an acceleration distance, and therefore, in all the power phase the human power is converted to the torque.

As a result, according to the structure of this embodiment, the power input is theoretically 1.2 times to 1.8 times the power input in a conventional bicycle, although it is dependent on the distance between the centers of the rotatable member and the supporting member and the radii of pitch circles thereof.

In this embodiment, the radii of the pitch circles of the rotatable member and the supporting member in the form of a rotatable member constituting the pair are the same, but they may be different within the spirit of the present invention. In this embodiment, the endless driving member has been in the form of a chain, but this is not limiting, and a belt, a timing belt, a special chain, a rope or the like is usable if the rotational force can be transmitted.

In this embodiment, no transmission is used, but the driven sprocket may be of multistage type, for example, 9 stages, or the chain ring may be of a three stage type.

The tests of a combination of the present invention with the multi stage transmission have revealed that main factors ruling the upper limit of the speed performance and uphill riding performance is the angular velocity of the rotatable member and the supporting member (both are sprockets in the foregoing embodiments) which constitute a pair. Also revealed is that smoothness of the standing position while riding is dependent on the angular velocity of the sprocket disposed at a lower position. When the pedal revolves around the sprockets, the ankle cannot follow the high angular velocity, and therefore, the change of the moving direction tends to be delayed. Particularly, when the pedal revolves around the upper sprocket, the foot tends to be apart from the pedal by the centrifugal force. As regards the latter, the foot may be secured on the pedal by a band or the like, or the foot is urged to the pedal consciously so as to follow the high angular velocity. The problem may be solved by being accustomed.

In the case of the bicycle, the radii of the pitch circles of the sprockets are determined in accordance with the usage and the drivers' preference. The radius of the pitch circle of the top sprocket is preferably not less than 52 mm (the number of teeth is 26 when an ordinary chain for bicycles is used) and not more than 116 mm (the number of teeth is 57), further preferably not less than 64 mm (the number of teeth is 32) and not more than 106 mm (the number of teeth is 52); and the radius of the pitch circle of the bottom sprocket is preferably not less than 64 mm (the number of teeth is 32 when an ordinary chain for bicycles is used) and not more than 116 mm (the number of teeth is 57), further preferably not less than 76 mm (the number of teeth is 38) and not more than 106 mm (the number of teeth is 52).

Figure 11:
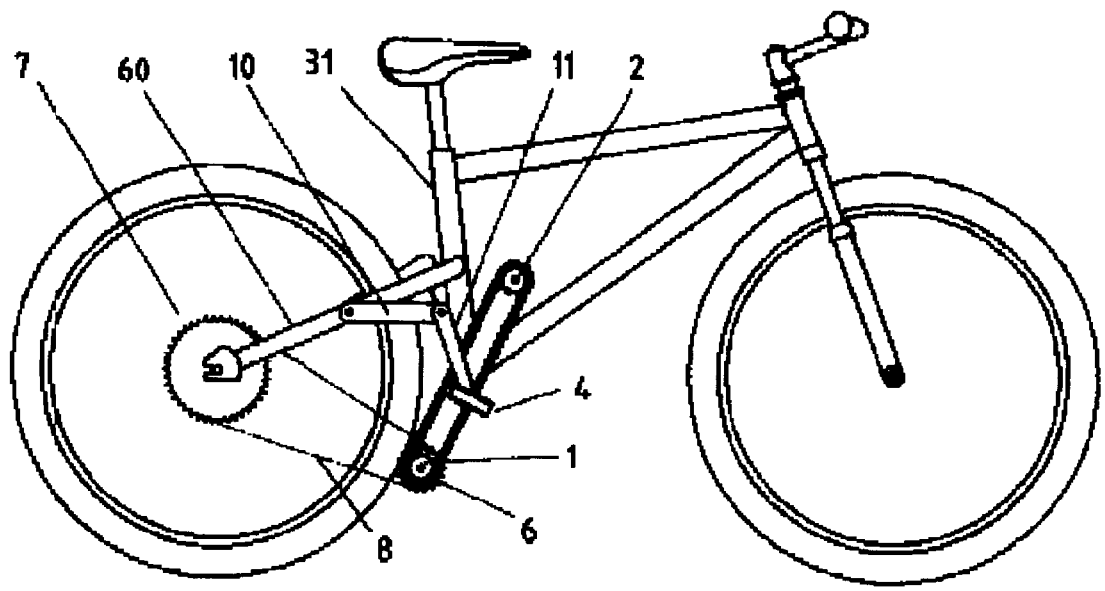
FIG. 11 is a side view of a human powered drive mechanism according to a second embodiment of the present invention which is applied to a bicycle.

FIG. 11 illustrates a second embodiment of the present invention which is applied to a bicycle, more particularly, it is a side view of embodiments in which the center of rotation of the free crank is disposed on a seat stay 60 outside the oval orbit of the chain behind the pedal. Other differences from the first embodiment are in that chain ring 6 takes a lower position, in the left and right human powered drive units are inclined relative to the vertical line by 26° and so on.

By disposing of the center of rotation of the free crank close to the rear wheel, it is avoided that crank or the arm hits an obstruction during rough road riding, and therefore, the arrangement of this embodiment suits a BMX and so on intending for the rough road riding. When the chain ring 6 is disposed at a lower position as in this embodiment, the length of the transmission chain 8 can be reduced. The human powered drive mechanism is inclined from the vertical line by 26° while the top and bottom positions of the pedal are the same as the conventional bicycle, so that pedal stroke is larger, and therefore, the power input increase is larger as compared with the case of the vertical arrangement. Here, the degree of inclination (26°) is only an example, and it is properly determined by one skilled in the art in consideration of the usage and the rider's preference. When the human powered drive mechanism is inclined as in this embodiment, the rider grips the maneuvering handle, and kicks down the pedal rearward, so that the pedal can be kicked using gluteus and back muscles, and therefore, a high power can be imparted to the pedal. In this embodiment, if the inclination angle of the human powered drive mechanism is properly selected, the rider can take the position close to that while running, with which the knee extends with the lowering of the pedal, and therefore, the load on the knee joints is significantly reduced.

Figure 12:
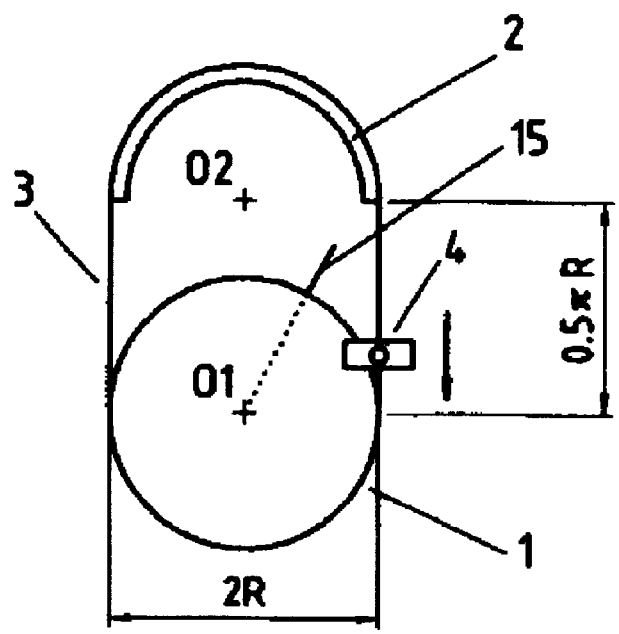
FIG. 12 is a schematic view of a human powered drive mechanism according to a third embodiment of the present invention.

FIG. 12 schematically illustrates a human powered drive mechanism according to a third embodiment of the present invention. The endless driving member 3 is extended around the rotatable member 1 and a semicircular guiding rail 2 (supporting member) having a radius R which is equal to the radius of the pitch circle of the rotatable member 1. The length of a linear portion of the endless driving member between the rotatable member 1 and the guiding rail 2 is 0.5 πR. The endless driving member 3 is provided with a pedal 4 which is kicked down by the rider substantially vertically as indicated by an arrow, by which the endless driving member 3 is moved along an oval orbit, and therefore, the rotatable member 1 is rotated, which rotates the driving shaft 15. In the case of bicycle, a chain ring is fixed on the driving shaft 15, and another unit is added with a pedal disposed with ½ period phase difference from the other one, similarly to Embodiment 1. In the case of the wheel chair, the driving shaft 15 is coaxial with a propulsion wheel. In the case of boat or the like, the driving shaft penetrates the hull and projects out, and a propulsion wheel such as a water wheel, propeller or the like at the free end of the projected shaft.

The endless driving member may be a chain, rope, timing gear or the like. Among them, the chain is advantageous in that friction loss is small since the rollers of the chain roll on a guiding rail 2.

When the third embodiment is applied to a bicycle, the power input is approx 1.18 times that of a conventional bicycle, on the assumptions that crank radius of the conventional bicycle is R; that average moving speeds of the pedals of the conventional bicycle and the bicycle of this example are the same; that in the linear range of the endless driving member at the power phase, the rotational force is kept at the same value as that at a crank angle of 90° given in FIG. 13; that in the linear range of the endless driving member at the recovery phase, the rotational force is kept at the same value as that at a crank angle of 270° given in FIG. 13; in the circular range of the endless driving member, the rotational force is equal to that of the corresponding crank angle given in FIG. 13.

In the physical meaning, the work is the product of the force acting on a point and the displacement of the point in the direction of the force, and therefore, if the displacement is zero, the work is zero no matter how large the force is. On the other hand, in order for a human body to apply a force, it is necessary to contract the muscle, and production of a force requires energy consumption. It is assumed that produced force integrated with time is substantially proportional to the energy consumed to keep the force. Then, the produced force is substantially proportional to the power (work rate) consumed by him or her. It is assumed that one foot of the rider applies a constant force F irrespective of the direction thereof in the power phase and that it is at rest in the recovery phase (F=0). Then, time average consumption of human power is the same in both the human powered drive mechanisms. Namely, the energy use efficiency is approx 1.18 times. In this embodiment, the length of the linear portion of the endless driving member is 0.5 πR, but if it is made longer, the power input is further increased.

Figure 14:
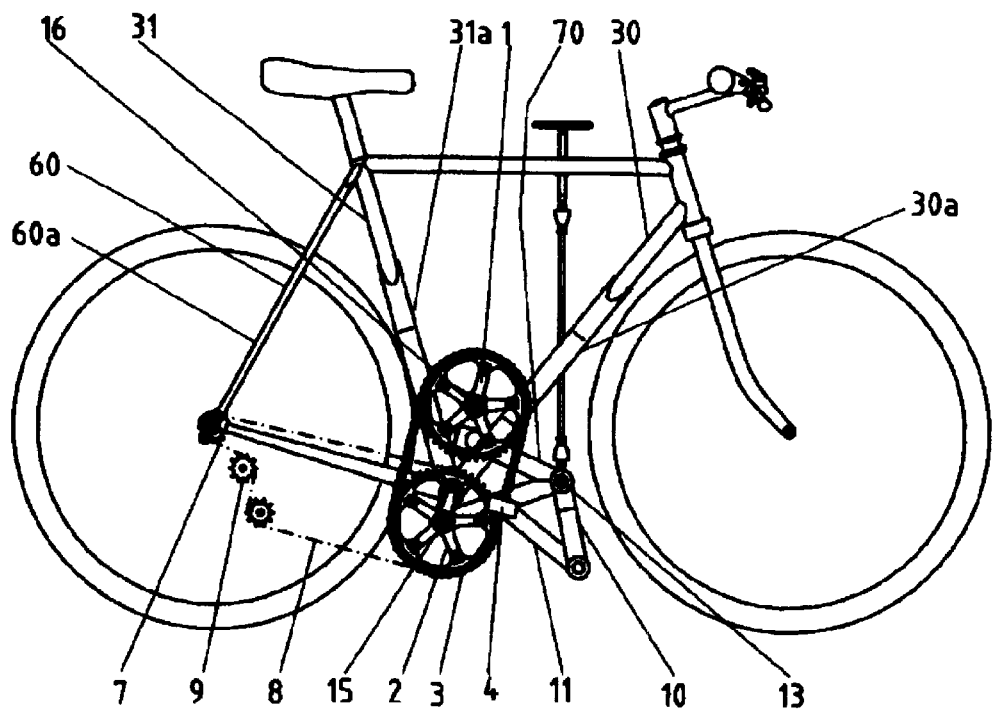
FIG. 14 is a side view of a human powered drive mechanism according to a fourth embodiment of the present invention which is applied to a bicycle.

FIG. 14 is a side view of a bicycle incorporating the human powered drive mechanism according to a fourth embodiment of the present invention, wherein the center of rotation (crank shaft 13) of the free crank is disposed frontward outside the oval orbit defined by the chain, and the left and right human powered drive units are inclined top side ahead by 15° from the vertical line. In this embodiment, a multi stage sprocket 7 is provided in the rear wheel with a derailleur 9, and the bracket supporting the human powered drive unit is a separate member as contrasted to the case of Embodiment 1, wherein the circular cylinder 32 is welded to the frame of the bicycle. It is rotatably held between left and right bottom brackets, both of which are connected to the bifurcated portions of the down tube, seat tube and chain stay. The bracket can be so tilted by the rider as to match the riding conditions. The driving shaft 15 having the first and the second rotatable members and the chain ring is disposed at a lower side unlike the first embodiment. Similarly to the first embodiment, the left and right idle shafts are separate members as with FIG. 9 embodiment, and the left and right crank shafts are separate as with FIG. 5 embodiment. The description will be made as to the fourth embodiment in detail.

Figure 15:
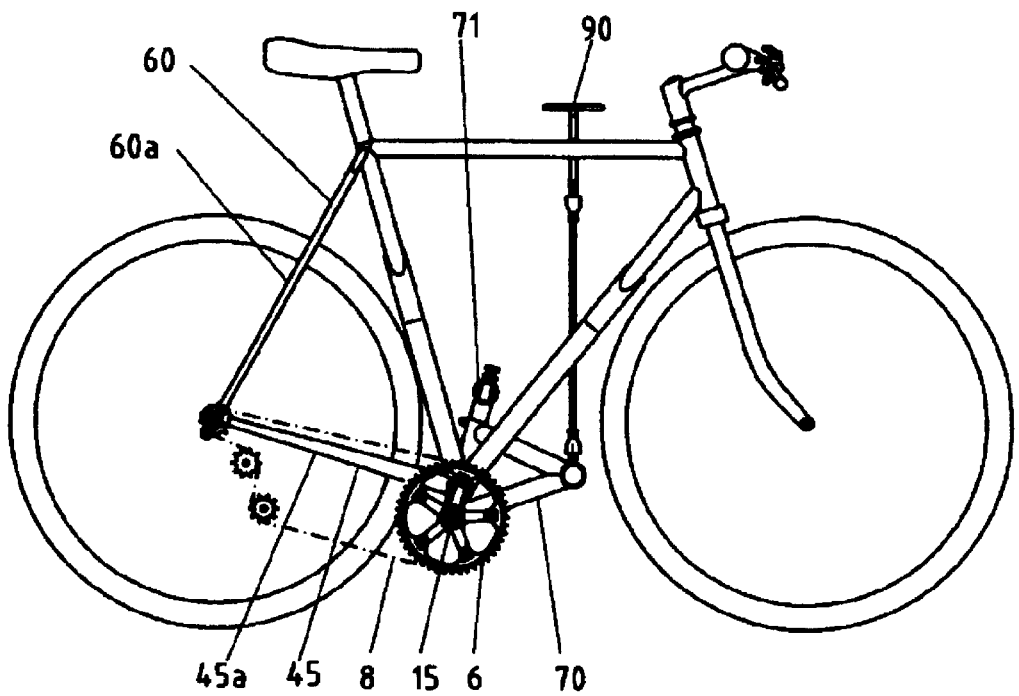
FIG. 15 is a side view in which the left and right human powered drive mechanisms are removed.
Figure 16:
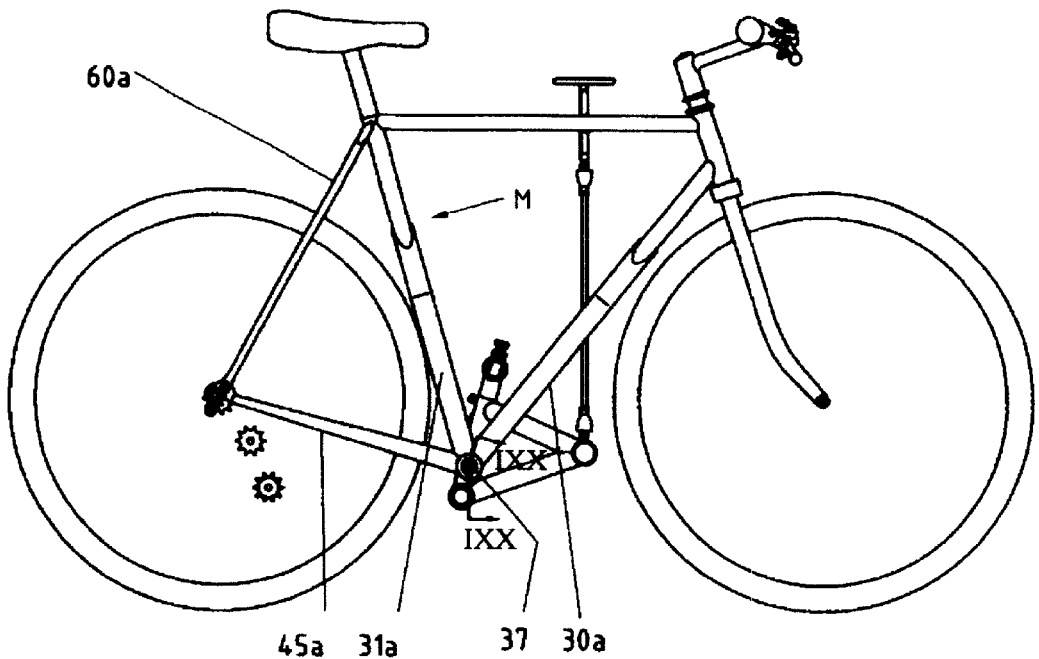
FIG. 16 is a side view a chain ring 6 and a transmission chain 8 are further removed.
Figure 17:
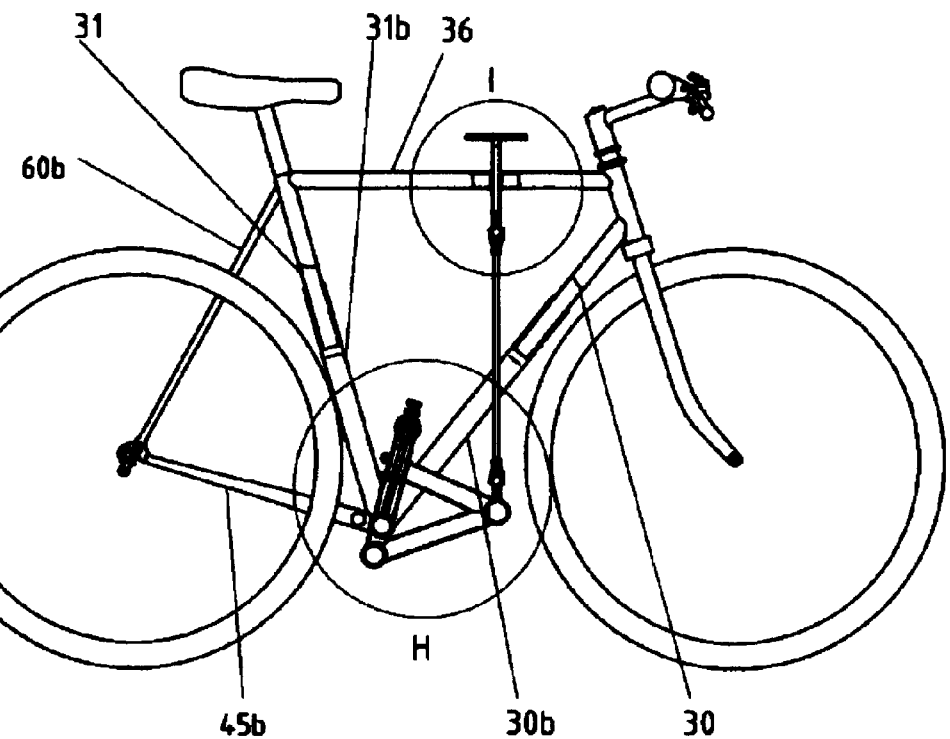
FIG. 17 is a partially sectional view in which parts of a bracket, a down tube and a seat tube are cut along a vertical plane including the center line of the bicycle.
Figure 18:
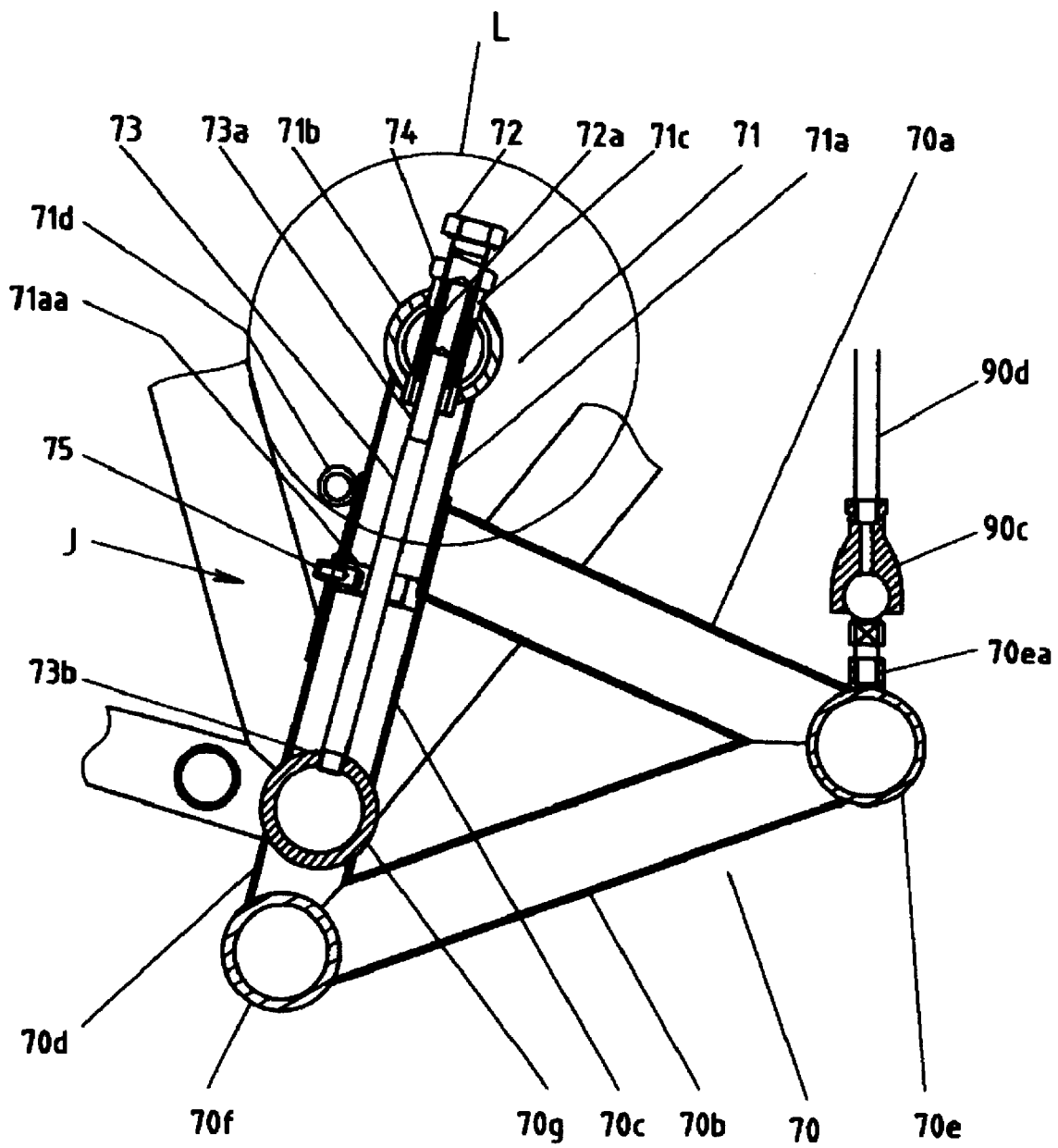
FIG. 18 illustrates details of a portion H of FIG. 17.
Figure 19:
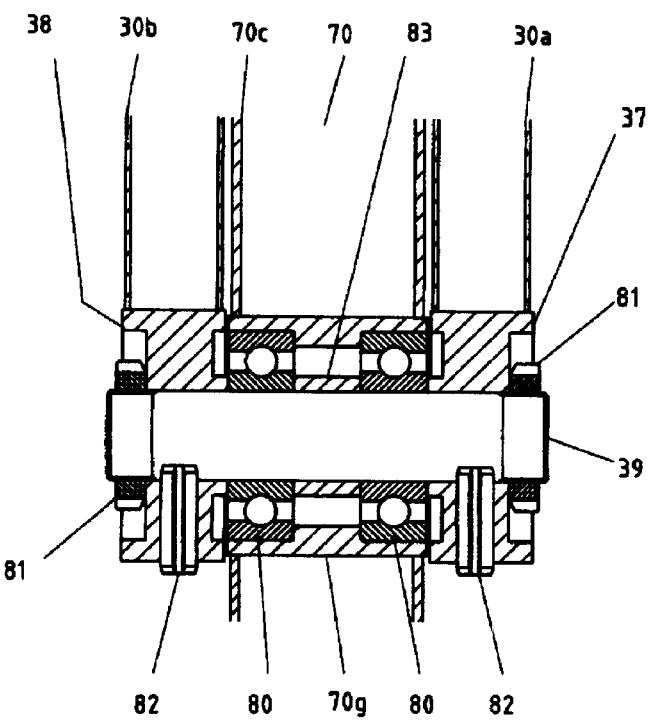
FIG. 19 is a sectional view taken along a G—G of FIG. 16.
Figure 20:
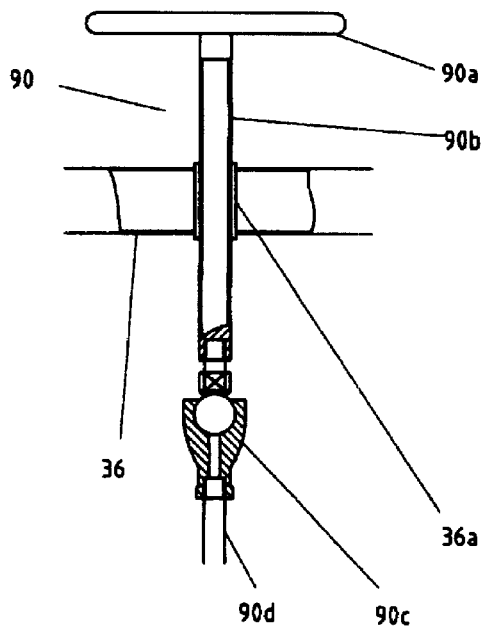
FIG. 20 illustrates details of I portion of FIG. 17.
Figure 21:
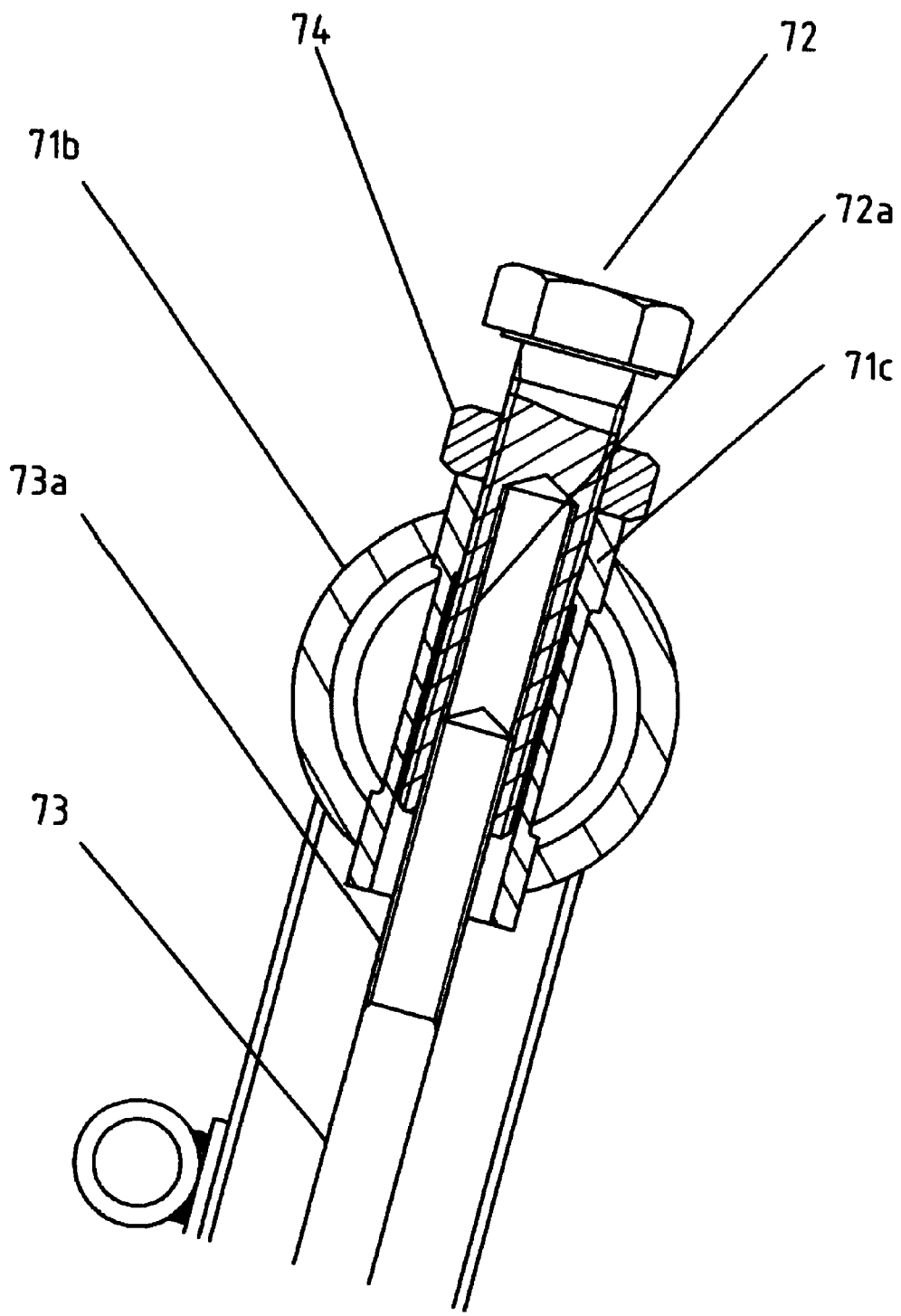
FIG. 21 is an enlarged view of L portion of FIG. 18.
Figure 22:
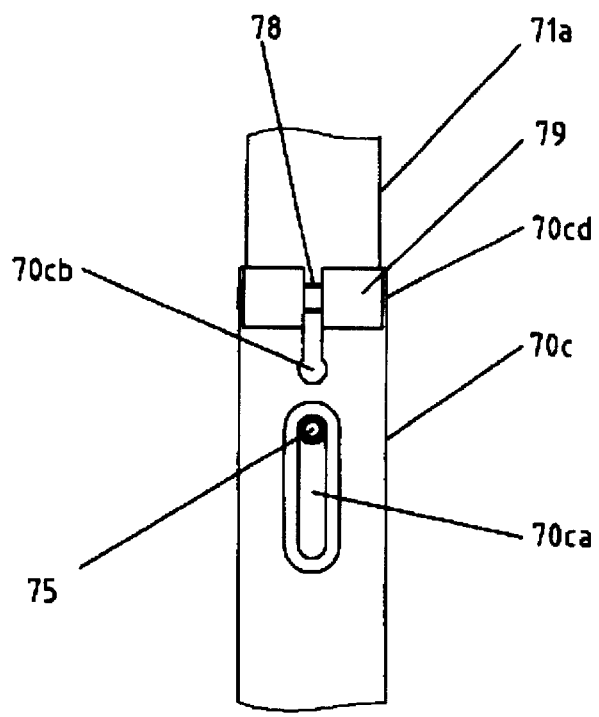
FIG. 22 is a view as seen in a direction J in FIG. 18.
Figure 23:
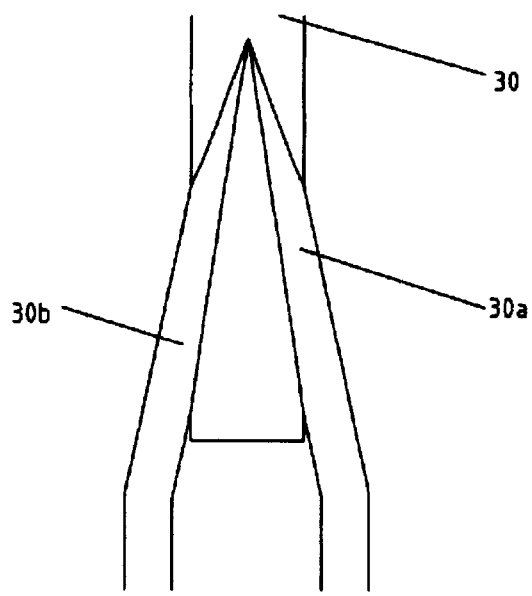
FIG. 23 is a view as seen in the direction M in FIG. 16.

FIG. 14 is a side view of a human powered drive mechanism according to a fourth embodiment of the present invention which is applied to a bicycle. FIG. 15 is a side view in which the left and right human powered drive mechanisms are removed. FIG. 16 is a side view a chain ring 6 and a transmission chain 8 are further removed. FIG. 17 is a partially sectional view in which parts of a bracket, a down tube and a seat tube are cut along a vertical plane including the center line of the bicycle. FIG. 18 illustrates details of a portion H of FIG. 17. FIG. 19 is a sectional view taken along a G—G of FIG. 16. FIG. 20 illustrates details of I portion of FIG. 17. FIG. 21 is an enlarged view of L portion of FIG. 18. FIG. 22 is a view as seen in a direction J in FIG. 18. FIG. 23 is a view as seen in the direction M in FIG. 16.

In FIGS. 14 to 19, the down tube 30 and the seat tube 31 are bifurcated at lower portions into right-hand member 30a and left-hand member 30b and into right-hand member 31a and left-hand member 31b, respectively. Three members, i.e., right-hand members 30a, 31a and right-hand member 45a of the chain stay 45 are gathered on the right-hand bottom bracket 37 and are welded with one another. Similarly, the left-hand members of the down tube, the seat tube and the chain stay 30b, 31b and 45b are gathered on the left-hand bottom bracket 38 and are welded with one another. As shown in FIG. 23, the down tube is in the form of a single cylindrical tube branched into two substantially oval tubes. The same applies to the seat tube.

In FIG. 19, the right-hand bottom bracket 37 and the left-hand bottom bracket 38 is securely fixed in the inner rings of two deep groove ball bearing together with a distance ring 83 in the bracket fixing boss 70g with a connection shaft 39 and nuts 81, by which the rigidity of the frame is assured, whereas the rotation of the main assembly 70 of the bracket is permitted. Designated by 82 is a spring pin for preventing relative rotation between the left and right bottom brackets.

In FIG. 18, designated by 70 is a main assembly of the bracket; 71 is a telescoping part of the bracket inserted into the vertical tube 70c of the main assembly 70 of the bracket; 70a, 70b, 70c, 70d are a top tube, down tube, vertical tube, vertical short tube constituting the main assembly of the bracket and they are welded together with a crank shaft boss 70e (corresponding to the element 33 in the first embodiment), driving shaft boss 70f (corresponding to the element 34 in the first embodiment) and a bracket fixing boss 70g. Thus, the main assembly 70 of the bracket has an triangular rigid frame structure of cylindrical tubes, and therefore, the bending rigidity and the torsional rigidity are so high that deformation is very small even when a large force applied to the pedal produces torsion to the boss 70e about the boss 70g through the arm and the free crank. Thus, the constraining function of the arm and the free crank is assured. Designated by 71a, 71b are a slide tube and an idler shaft boss (corresponding to the element 35 in the first embodiment) which are welded together to constitute a telescoping part of the bracket. The lower end of the slide tube is provided with a ring 71aa which has a guide pin 75 at its side, and the guide pin is movable along a groove 70ca (FIG. 22) in the vertical tube 70c of the bracket 70 so that parallelism among the center lines of the crank shaft boss, the driving shaft boss, the idler shaft boss and the bracket fixing boss 70g is maintained.

A small gap is provided between the inner surface of the vertical tube 70c of the main assembly of the bracket and the outer periphery of the slide tube 71a of the telescoping part of the bracket to permit adjustment of the distance between centers of the sprockets constituting the pair, that is, the distance between the center of the driving shaft boss 70f and the center of the idler shaft boss 71b. However, they are securely fixed by tightening a pair of clamps 79s at the top of the vertical tube 70c with a cap screw 78 (the head of the bolt is not seen since it is in the clamp). In FIG. 22, designated by 70cb is a slit formed in the vertical tube 70c to facilitate the tightening operation. The tightening direction of the cap screw is preferably parallel with the center line of each of the bosses as shown in FIGS. 18, 22 so as to avoid the influence of the tilting of the slide tube due to the clamping on the parallelism between the center line of the idler shaft boss and the center line of the other boss.

In FIGS. 18, 21, designated by 71c is a tightening bolt nozzle having a threaded inside and inserted into and welded to the idler shaft boss 71b; 72 is a tension adjusting bolt screwed into the tightening bolt nozzle 71c and having a threaded inside (72a); 73 is a tightening bolt screwed into the tightening bolt at the upper threaded portion 73a and having a lower end secured to the bracket fixing boss by screws. Designated by 74 is a lock nut for preventing loosening. A combination of the tension adjusting bolt and the tightening bolt is known as differential screws. By selecting the combination of pitches and winding directions of the inner and outer threads, either very fine adjustment of the tension or quick tightening is accomplished.

In FIGS. 18 and 20, designated by 90 is a bracket positioning mechanism; 90a is an adjusting handle; 90b is a handle bar fixed to the adjusting handle and screwed in the boss 36a provided in the top tube 36; 90d is an adjusting rod having spherical joints 90c rotatably engaged with the handle bar 90b at the top end and rotatably engaged with a projection 70ea of the crank shaft boss 70e of the main assembly of the bracket at the bottom end. By rotating the adjusting handle 90a, the handle bar rises and lowers to adjust the position of the bracket.

Figure 24:
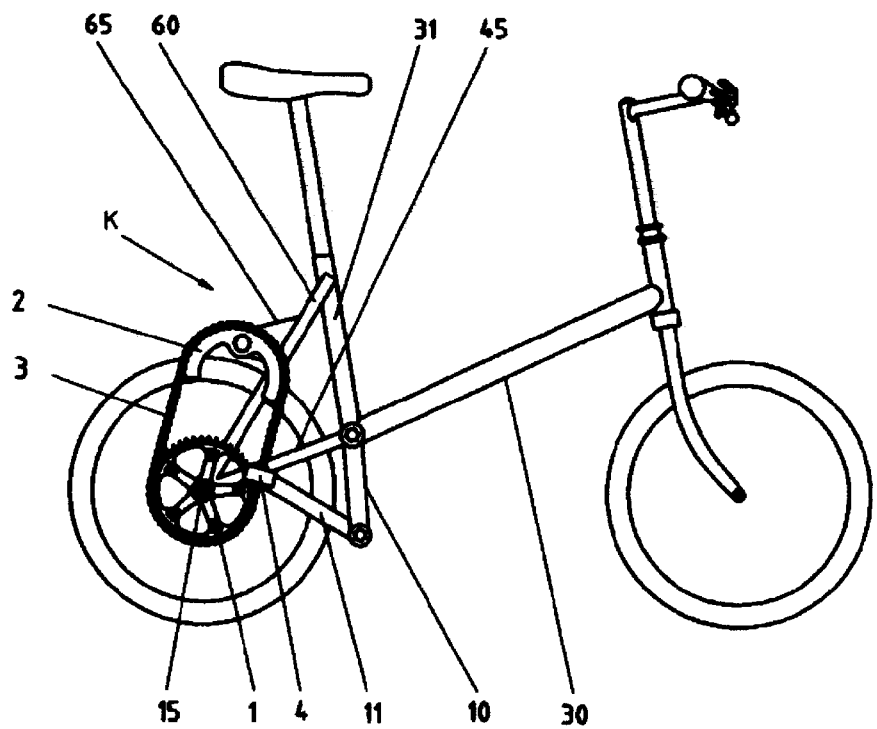
FIG. 24 is a side view of a human powered drive mechanism according to the fifth embodiment of the present invention which is applied to a bicycle.
Figure 25:
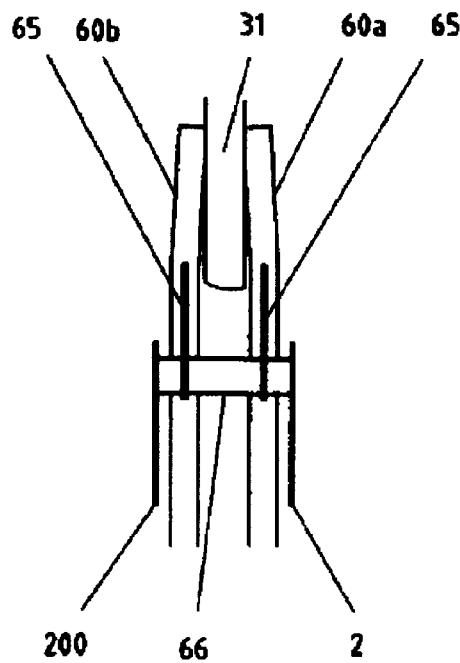
FIG. 25 is a view as seen in the direction K in FIG. 24.

In this embodiment, the bracket 70 is rotatably supported on the left and right bottom brackets through bearings, it may, however, be directly fixed by bolt and nut. FIG. 24 is a side view of a human powered drive mechanism according to a fifth embodiment of the present invention which is used in a bicycle. In this embodiment, the rotatable members of the left and right human powered drive units having the same structures are coaxial with the rear wheel. FIG. 25 is a view as seen in a direction K of FIG. 24 (no chain is shown). Referring to FIG. 24, the description will be made for the right-hand unit. It comprises a rotatable member 1 at the bottom, a top guiding rail 2 and a chain 3. The rotatable member 1 of the right-hand unit and unshown rotatable member 100 of the left-hand unit are mounted to the opposite end of a driving shaft 15. There is a bearing (not shown) at a connecting portion of the seat stay 60 and the chain stay 45, and on the portion between the two bearings of the driving shaft are provided a rear wheel attached directly or through a planetary gear transmission, a ratchet mechanism or the like. The driving shaft 15 may be divided into left and right parts depending on the structures of the transmission and/or the ratchet mechanism as long as they are coaxial with each other.

In FIG. 25, the thicknesses of the guiding rail 2 and 200 are slightly smaller than the width of the chain roller, and the guiding plate is fixed to a right-hand seat stay 60a and a left-hand seat stay 60b through a cylindrical stay 66 and through the left and right ribs 65. Here, in an alternative, the guiding rail is made movable to tighten the chains 3 and 300. In this embodiment, the driving shaft 15 of the rotatable member of the human powered drive mechanism also functions as a shaft of the rear wheel, thus neither transmission chain nor chain ring is used. In this embodiment, the human powered drive mechanism is directly supported by the frame of the main assembly of the bicycle, and the center of rotation of the free crank is provided in the bottom bracket having a large rigidity, the weight is small considering the high rigidity. For this reason, the mechanism of this embodiment is suitably used for portable and foldable bicycle or the like.

The size of the rear wheel is selected such that the rider can turn the pedals without difficulty. Preferably, it is not less than 14 in. And not more than 26 in., and further preferably, not less than 17 in. And not more than 22 in. In the foregoing description, one rotatable member and one supporting member are used per one human powered drive unit, but a plurality of them may be used if the chain is driven directly by a pedal or the like with an increased period of continuous maximum rotational force.

INDUSTRIAL APPLICABILITY

According to the human powered drive mechanism of the present invention, the power input is increased, and when it is applied to a bicycle, the speed performance and uphill riding performance are improved. Moreover, when the present invention is used for a tricycle, four-wheel-cycle, wheelchair, boat or human powered plane, the power input is increased, and the performance is improved both in speed and torque. When the present invention is applied to the training equipment, the builder-upper equipment which is similar to a bicycle or boat is provided. When the large curvature radius portion of the human powered drive mechanism is positioned vertically, and the distance between the centers of the rotatable member and the supporting member is made smaller, thus reducing the pedal stroke, and the motions of the feet and the loins are quite like those during walking, so that present invention is applicable to a walk training machine for rehabilitation of people hard to walk.

What is claimed is:

1. A human powered drive mechanism comprising a rotatable member, a supporting member, an endless driving member extended around said rotatable member and said supporting member, a human powered drive receiving portion mounted to said endless driving member, and constraining means for constraining rotation of said drive receiving portion about a line included in a plane in which the endless driving member moves, wherein said supporting member is rotatable, and said human powered drive receiving portion is capable of circulating with said endless driving member, and wherein said constraining means includes an arm having one end rotatably mounted to said drive receiving portion and a free crank having one end rotatably mounted to a frame and another end rotatably mounted to another end of the arm.

2. A human powered drive mechanism according to claim 1, wherein said endless driving member is movable along a large curvature radius portion, first and second small curvature radius portions, and said endless driving member is extended around said supporting member and said rotatable member at the first and second small curvature radius portions.

3. A human powered drive mechanism according to claim 1, wherein said drive receiving portion is rotatable about an axis substantially perpendicular to a plane in which said endless driving member moves.

4. A human powered drive mechanism according to claim 1, wherein a rotation axis of said free crank is disposed outside an orbit formed by said endless driving member.

5. A human powered drive mechanism according to claim 1, wherein said mechanism is used with a bicycle.

6. A human powered drive mechanism according to claim 1, wherein an inclination angle of a large curvature radius portion of said endless driving member relative to a ground surface is variable.

7. A human powered drive mechanism according to claim 1, wherein said endless driving member includes a plurality of links, and one of said links constitutes a driving force receiving link, wherein said driving force receiving link is provided with a shaft projected in a direction perpendicular to a plane in which said endless driving member moves, and said driving force receiving link is rotatably mounted to said constraining means through the shaft.

8. A human powered drive mechanism according to claim 7, wherein the shaft is integral with said driving force receiving link, and is rotatable relative to said constraining means.

9. A human powered drive mechanism according to claim 7, wherein said driving force receiving link is provided with a U-shaped groove, in which said driving force receiving link is rotatably connected with an adjacent link of said endless driving member.

10. A human powered drive mechanism according to claim 7, wherein said driving force receiving link is rotatably mounted to said constraining means by a roller bearing or a linear motion bearing such as a linear bush or the like.

11. A human powered drive mechanism comprising a first rotatable member, a first supporting member, a first endless driving member extended around said first rotatable member and said first supporting member, a second rotatable member, a second supporting member, a second endless driving member extended around said second rotatable member and said second supporting member, a first human powered drive receiving portion mounted to said first endless driving member and a second human powered drive receiving portion mounted to said second endless driving member, wherein said first rotatable member and second rotatable member are coaxial with each other and are fixed to each other by a shaft member, said shaft member comprising a third rotatable member between said first and second rotatable members, wherein said first supporting member is rotatable, and said first human powered drive receiving portion is capable of circulating with said first endless driving member, and wherein said second supporting member is rotatable, and said second human powered drive receiving portion is capable of circulating with said second endless driving member.

* * * * *